(12) United States Patent
Koga et al.

(10) Patent No.: US 8,229,348 B2
(45) Date of Patent: *Jul. 24, 2012

(54) DATA TRANSMITTING APPARATUS AND METHOD

(75) Inventors: Tadaharu Koga, Tokyo (JP); Satoko Nakatsuka, Chiba (JP); Yasushi Kikuta, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/123,679

(22) Filed: May 6, 2005

(65) Prior Publication Data

US 2005/0201313 A1    Sep. 15, 2005

Related U.S. Application Data

(63) Continuation of application No. 10/931,067, filed on Aug. 30, 2004, which is a continuation of application No. 09/341,324, filed on Jul. 9, 1999.

(30) Foreign Application Priority Data

Nov. 11, 1997 (JP) .................................. 09-308488
Nov. 28, 1997 (JP) .................................. 09-327881

(51) Int. Cl.
*H04H 40/00* (2008.01)

(52) U.S. Cl. ............ 455/3.06; 370/313; 380/4; 705/26; 725/111

(58) Field of Classification Search ............... 455/412.1, 455/418, 556.1, 557, 414.3, 414.1, 3.06, 455/157.2, 158.2, 158.3, 158.5; 725/100, 725/40, 131, 151, 80, 90, 111; 345/327; 348/569.43, 986; 704/226, 201; 709/231, 709/203, 219, 228; 370/313, 392, 477, 469; 380/4; 705/26

See application file for complete search history.

(56) References Cited

U.S. PATENT DOCUMENTS 4,789,863 A    12/1988  Bush
(Continued)

FOREIGN PATENT DOCUMENTS

DE    44 22 015    8/1995
(Continued)

OTHER PUBLICATIONS

Yoshimura Toshiro, Senoo Hiroshi, Ohta Masatoshi, Kai Kenjiro, Isobe Tadashi, "A receiving method for the Data Channel services with index information", Proceeding of the Autumn Convention, IEICE 1991, [part 2] communication and electronics, Sep. 8, 1991, p. 2-109.

(Continued)

*Primary Examiner* — Danh Le
*Assistant Examiner* — Dinh P Nguyen
(74) *Attorney, Agent, or Firm* — Oblon, Spivak, McClelland, Maier & Neustadt, L.L.P.

(57) ABSTRACT

A ground station multiplexes audio digital data of a plurality of audio broadcasts, GUI data, and download audio data and transmits the multiplexed signal to a receiving side through a satellite. The receiving side displays a GUI screen corresponding to an audio broadcast. When a music information selection command is input on the display screen, an audio broadcast of a music program corresponding to the music information is selected. When a music information download command is input on the display screen, download audio data corresponding to the music information is output. The download audio data is stored to a storage device so as to download audio data corresponding to a desired music title.

25 Claims, 27 Drawing Sheets

U.S. PATENT DOCUMENTS

| | | | |
|---|---|---|---|
| 5,195,134 A | 3/1993 | Inoue | |
| 5,239,540 A | 8/1993 | Rovira et al. | |
| 5,576,951 A * | 11/1996 | Lockwood | 705/27 |
| 5,633,686 A * | 5/1997 | Boden | 348/441 |
| 5,636,276 A * | 6/1997 | Brugger | 705/54 |
| 5,661,787 A | 8/1997 | Pocock | |
| 5,778,187 A * | 7/1998 | Monteiro et al. | 709/231 |
| 5,850,218 A | 12/1998 | LaJoie et al. | |
| 5,896,555 A | 4/1999 | Yoshinobu et al. | |
| 5,963,916 A * | 10/1999 | Kaplan | 705/7.29 |
| 6,029,064 A | 2/2000 | Farris et al. | |
| 6,061,387 A * | 5/2000 | Yi | 375/142 |
| 6,062,868 A | 5/2000 | Toriumi et al. | |
| 6,166,778 A | 12/2000 | Yamamoto et al. | |
| 6,212,359 B1 | 4/2001 | Knox | |
| 6,212,555 B1 * | 4/2001 | Brooks, et al. | 709/219 |
| 6,230,322 B1 | 5/2001 | Saib et al. | |
| 6,314,577 B1 | 11/2001 | Pocock | |
| 6,359,636 B1 * | 3/2002 | Schindler et al. | 715/846 |
| 6,363,413 B2 * | 3/2002 | Kidder | 709/203 |
| 6,496,983 B1 * | 12/2002 | Schindler et al. | 725/153 |
| 6,515,680 B1 | 2/2003 | Hendricks et al. | |
| 6,516,467 B1 * | 2/2003 | Schindler et al. | 725/153 |
| 6,757,913 B2 * | 6/2004 | Knox | 725/153 |
| 6,901,242 B2 * | 5/2005 | Kroeger et al. | 455/45 |
| 6,959,288 B1 * | 10/2005 | Medina et al. | 705/51 |
| 7,305,698 B1 | 12/2007 | Tanigawa et al. | |
| 2002/0150390 A1 | 10/2002 | Arai et al. | |
| 2005/0240395 A1 * | 10/2005 | Wiser et al. | 704/201 |
| 2005/0248475 A1 * | 11/2005 | Wiser et al. | 341/50 |
| 2006/0271989 A1 * | 11/2006 | Glaser et al. | 725/111 |

FOREIGN PATENT DOCUMENTS

| | | |
|---|---|---|
| EP | 0 794 625 | 9/1997 |
| JP | 55-156485 | 12/1980 |
| JP | 61-050433 T | 3/1986 |
| JP | 62-242424 | 10/1987 |
| JP | 01-265621 | 10/1989 |
| JP | 03-500476 | 1/1991 |
| JP | 3048024 | 3/1991 |
| JP | 5-75555 | 3/1993 |
| JP | 05-152986 | 6/1993 |
| JP | 6-197086 A | 7/1994 |
| JP | 06-334955 | 12/1994 |
| JP | 07-045050 | 2/1995 |
| JP | 07-074853 | 3/1995 |
| JP | 07-143081 | 6/1995 |
| JP | 07-212327 | 8/1995 |
| JP | 07-219572 | 8/1995 |
| JP | 7-234881 | 9/1995 |
| JP | 07-240725 | 9/1995 |
| JP | 7-284033 | 10/1995 |
| JP | 7-288759 | 10/1995 |
| JP | 7-288783 | 10/1995 |
| JP | 7-334972 | 12/1995 |
| JP | 8-056350 | 2/1996 |
| JP | 8-098105 | 4/1996 |
| JP | 08-101671 | 4/1996 |
| JP | 08-102922 | 4/1996 |
| JP | 08-146980 | 6/1996 |
| JP | 08-160971 | 6/1996 |
| JP | 8-202940 | 8/1996 |
| JP | 08-213962 | 8/1996 |
| JP | 8-213962 | 8/1996 |
| JP | 08-256174 | 10/1996 |
| JP | 08-274670 | 10/1996 |
| JP | 08-279796 | 10/1996 |
| JP | 08-306126 | 11/1996 |
| JP | 8265726 | 11/1996 |
| JP | 09-008751 | 1/1997 |
| JP | 9-511368 T | 1/1997 |
| JP | 9-71365 | 3/1997 |
| JP | 09-081166 | 3/1997 |
| JP | 9-97262 | 4/1997 |
| JP | 9-114781 | 5/1997 |
| JP | 09-121197 | 5/1997 |
| JP | 09-127962 | 5/1997 |
| JP | 9-190192 | 7/1997 |
| JP | 09-224232 | 8/1997 |
| JP | 9-247105 | 9/1997 |
| JP | 09-258756 | 10/1997 |
| JP | 9-265731 | 10/1997 |
| JP | 09-266569 | 10/1997 |
| JP | 09-284238 | 10/1997 |
| JP | 10-163988 | 6/1998 |
| JP | 10-241228 | 9/1998 |
| WO | 95/26596 T | 10/1995 |
| WO | WO-95/29543 | 11/1995 |
| WO | WO-97/21291 | 6/1997 |

OTHER PUBLICATIONS

Oshita Bunsuke, "Application of Information Highway Entertainment", Trans. of IEICE, Apr. 25, 1995, vol. 78, No. 4, p. 395-400.

Nikkei PC, "Let's View the Text Television using PC for the Utilization of the Usable Information Source in advance", Feb. 26, 1996, No. 259, p. 224-228.

Kazuya Usui, Toshiro Yoshimura, Akira Otani, High fictionalization of television in ISDB, Institute of Television Engineers of Japan technical report, Mar. 18, 1994, vol. 18, No. 21, p. 19-24.

Fumisuke Ohshita, "Use of information highway, Entertainment", Institute of Electronics, Information and Communication Engineers magazine, Apr. 25, 1995, vol. 78, No. 4, p. 395-400.

Kenjiro Kai, Hiroshi Senoo, Tadashi Isobe, "Navigational in the multimedia information broadcasting service", The Information Processing Society of Japan memoir, Sep. 14, 1995, vol. 95, No. 90, p. 9-16.

Office Action issued Sep. 7, 2010, in Japan Patent Application No. 2008-199193.

Tadashi Isobe, Expansion to satellite data broadcasting and ISDB, NHK Giken news, May 1, 1992, No. 28, p. 6-10.

Hiroshi Senoo, Toshiro Yoshimura, Kenjiro Kai, Tadashi Isobe, "A study of the transmission method of high functionalized Teletext (Present)", Institute of Television Engineers of Japan technical report, Oct. 29, 1992, vol. 16, No. 71, p. 1-6.

Japanese Office Action HEI 11-525969, May 19, 2008.

* cited by examiner

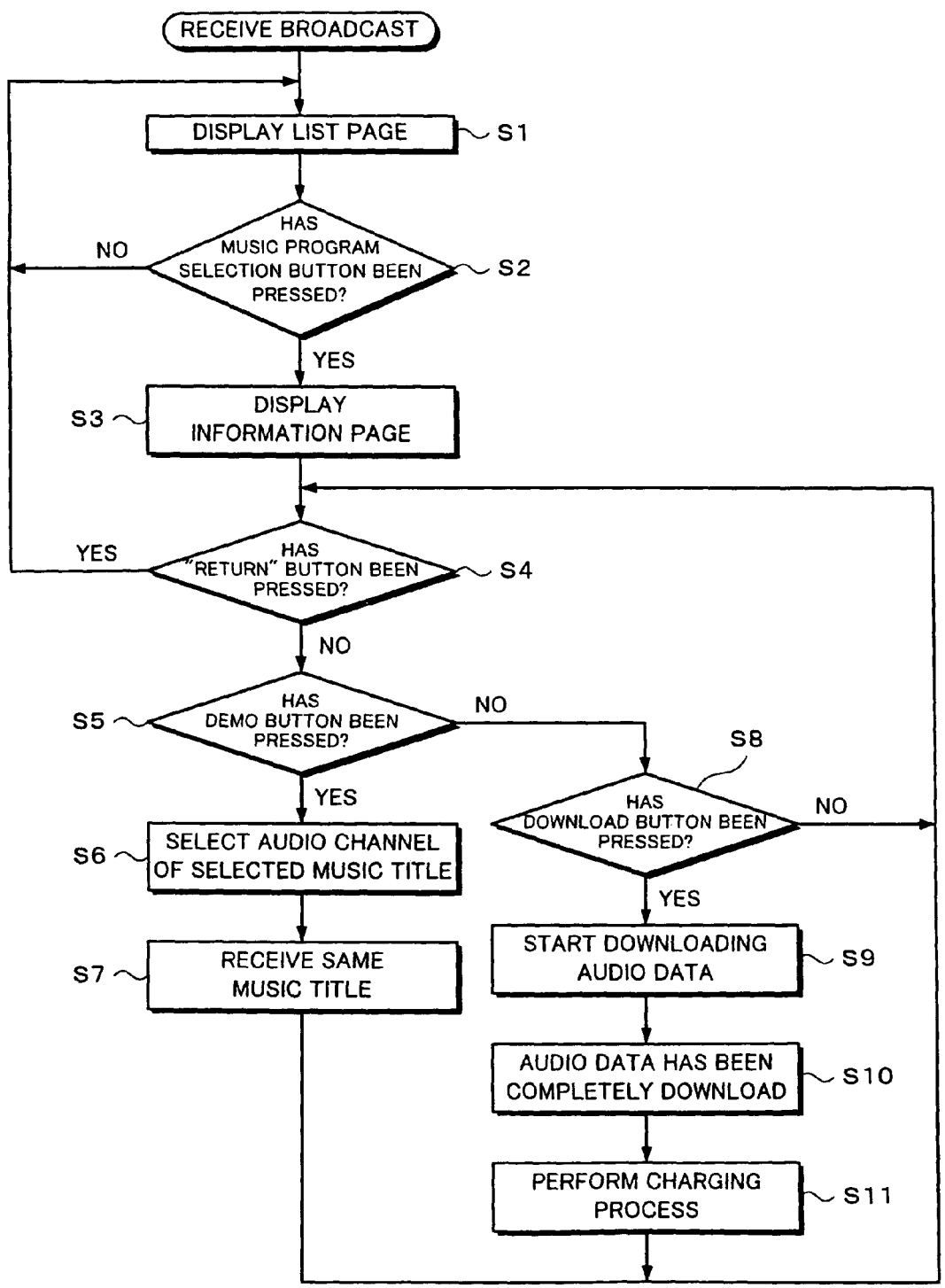

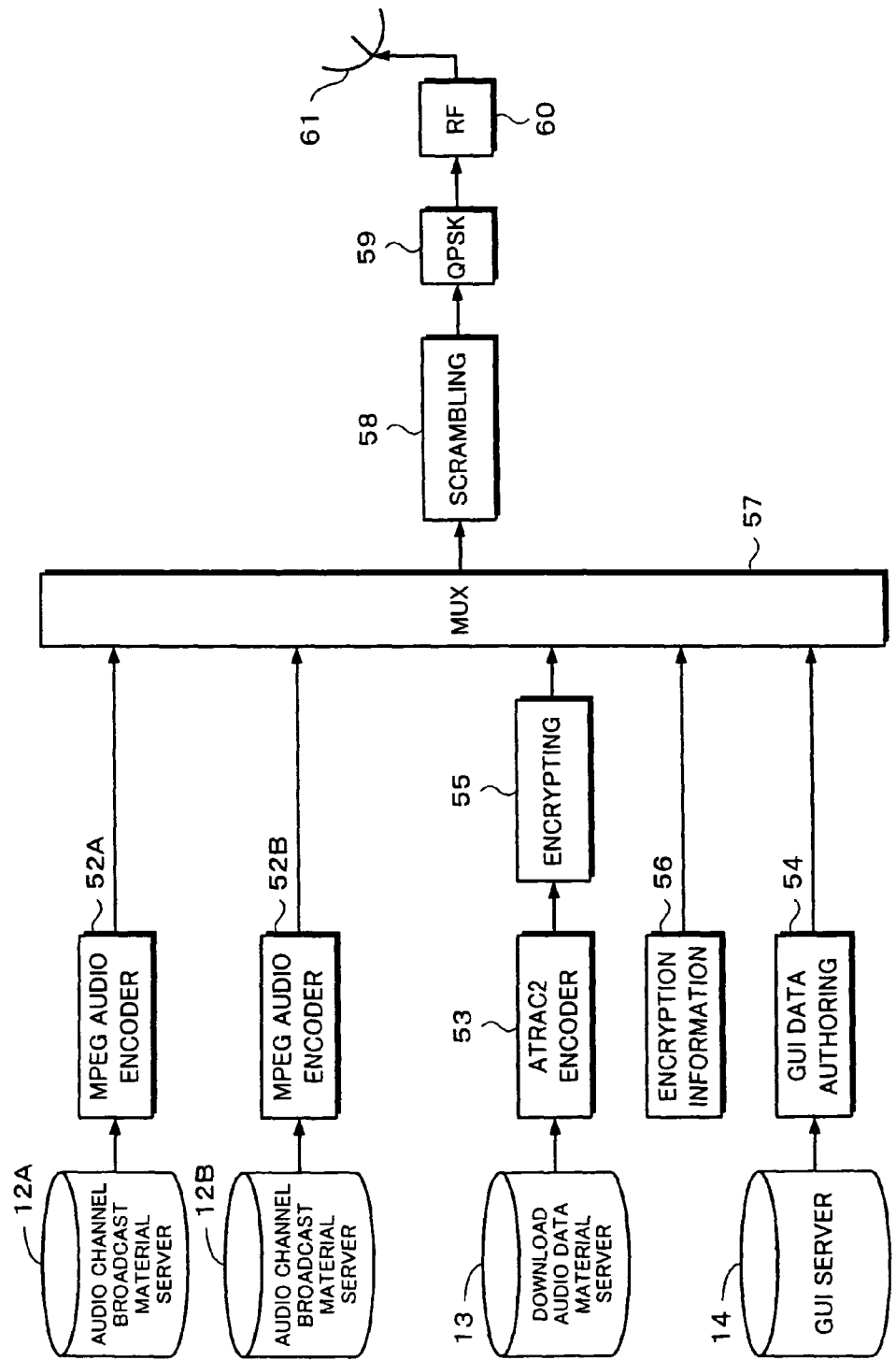

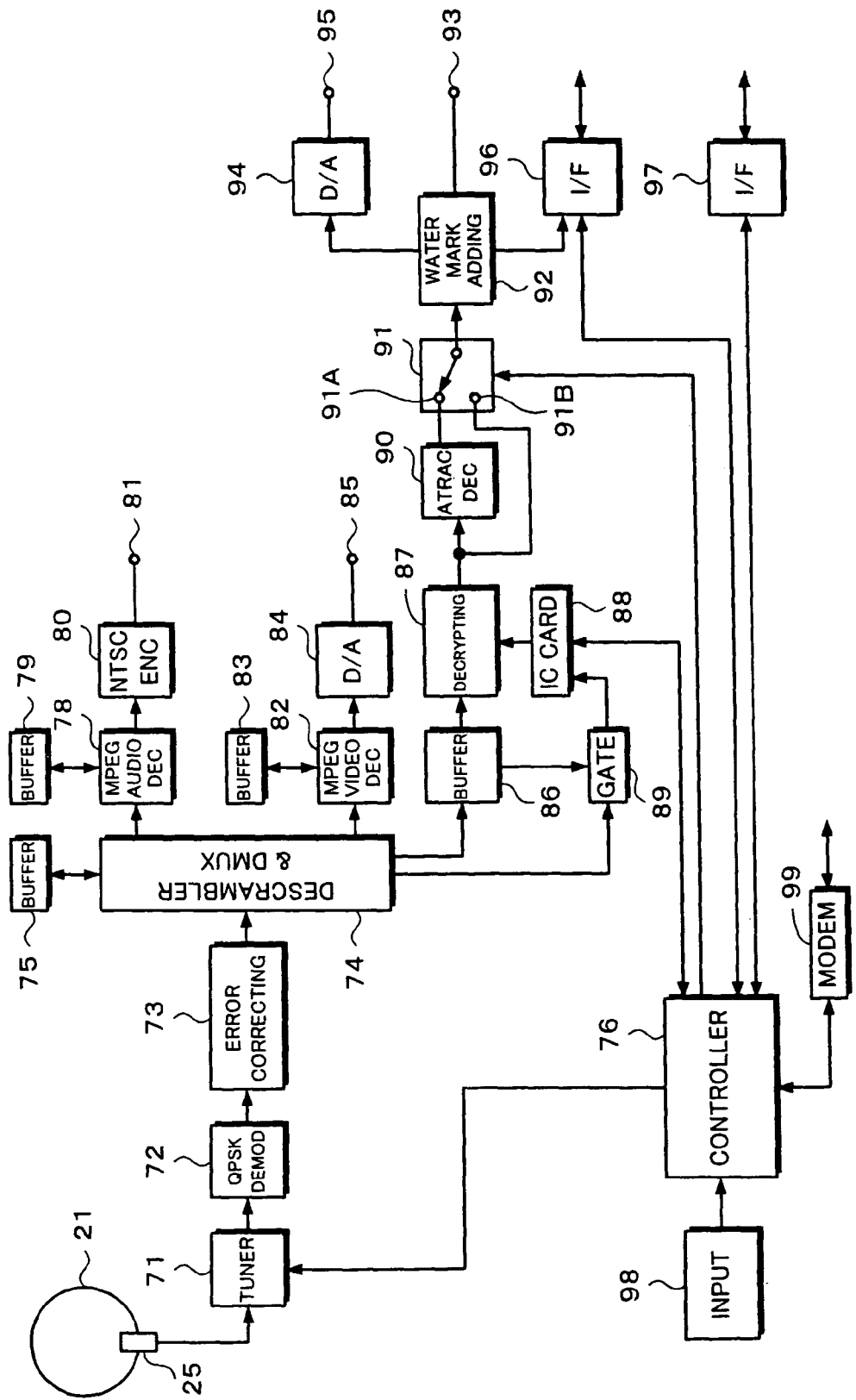

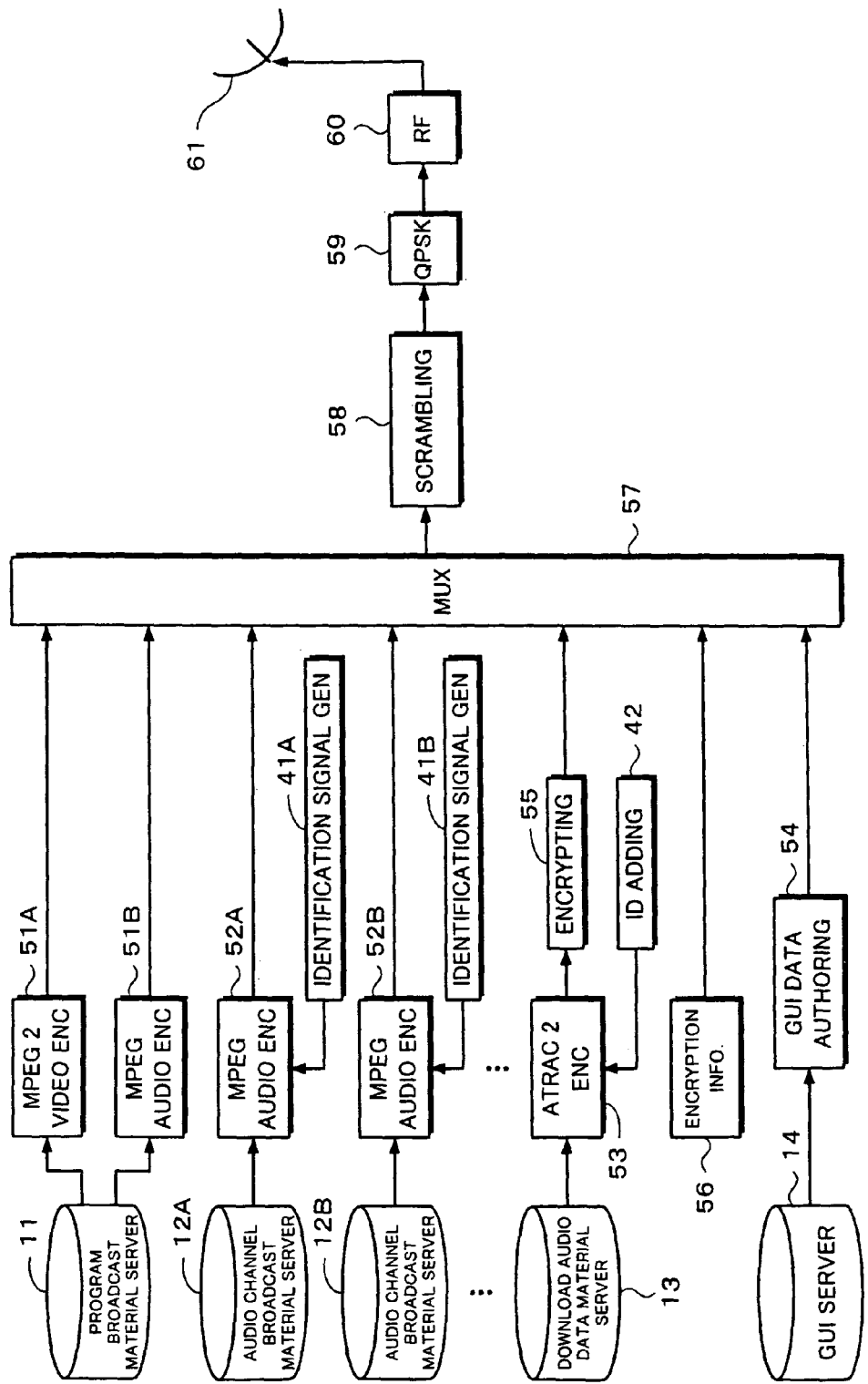

DATA TRANSMITTING APPARATUS AND METHOD

CROSS-REFERENCE TO RELATED APPLICATIONS

This is a continuation of U.S. application Ser. No. 10/931,067 filed Aug. 30, 2004, which is a continuation of U.S. application Ser. No. 09/341,324 filed Jul. 9, 1999, the disclosures of which are incorporated herein by reference.

BACKGROUND OF THE INVENTION

The present invention relates to a transmitting apparatus and method, an information editing apparatus and method, a receiving apparatus and method, and information storing apparatus and method, and a broadcasting system suitable for transmitting music programs with a satellite broadcast.

Digital satellite broadcasts have become common. The digital satellite broadcasts have higher resistance against noise and fading than conventional analog broadcasts. Thus, in the digital broadcasts, high quality signals can be transmitted. In addition, since the frequency use efficiency is improved, many channels can be accomplished. In the digital satellite broadcasts, dedicated channels such as a sports channel, a movie channel, a music channel, and a news channel are provided. On these dedicated channels, special programs are broadcast 24 hours a day.

Among the dedicated channels, a music channel is one of the popular channels. On conventional music channels, promotion video programs that are new music title guide programs and hit chart programs are broadcast.

On the conventional music programs, new music title guide programs and hit chart programs are transmitted with moving pictures and sound. When the listener likes a music title that is being broadcast on a music channel, he or she may want to buy a CD that contains the music title to enjoy it. In addition, the listener may want to know information of the artists of the music title and information of the album that contains the music title. It will be very convenient for the listener to obtain information of the artists and information of the album of the music title and to download data of the music title at his or her location. However, on the conventional music channel, moving pictures and sound are unidirectionally broadcast. Thus, the conventional music channels do not satisfy such needs.

Therefore, an object of the present invention is to provide a transmitting apparatus and method, an information editing apparatus and method, a receiving apparatus and method, an information storing apparatus and method, and a broadcasting system that allow the user to easily obtain information of a music title that is being broadcast.

Another object of the present invention is to provide a transmitting apparatus and method, an information editing apparatus and method, a receiving apparatus and method, an information storing apparatus and method, and a broadcasting system that allow the user to easily obtain data of a music title that is being broadcast.

DISCLOSURE OF THE INVENTION

The present invention is a broadcasting system having a transmitting station that broadcasts audio programs and a receiving station that receives a signal from the broadcasting system; a transmitting apparatus and a transmitting method that compose the broadcasting system; an information editing apparatus and an information editing method; a receiving apparatus and a receiving method; and an information storing apparatus and an information storing method. The transmitting station has a transmitting apparatus comprising a plurality of audio channel material supplying means for supplying a plurality of audio broadcast materials of audio digital data, a data supplying means for supplying digital data for an audio information screen corresponding to a transmitted audio broadcast, a download audio data supplying means for supplying download audio data compressed in a predetermined compressing format, a multiplexing means for multiplexing the audio digital data of the plurality of audio broadcasts, the digital data for the audio information screen corresponding to the transmitted audio broadcast, and the download audio data, and a transmitting means for transmitting the multiplexed data.

The receiving station has a receiving apparatus comprising a receiving means for receiving a signal of which audio digital data of a plurality of audio broadcasts, digital data for an audio information screen corresponding to a transmitted audio broadcast, and download audio data of audio data compressed in a predetermined compressing format have been multiplexed, a data demultiplexing means for demultiplexing the multiplexed signal into the audio digital data of the plurality of audio broadcasts, the digital data for the audio information screen corresponding to the transmitted audio broadcast, and the download audio data compressed in the predetermined compressing format, an audio reproducing means for reproducing sound from the audio digital data, a download data decoding means for decoding the download audio data, a displaying means for displaying audio information of the transmitted audio broadcast corresponding to the digital data for the audio information screen corresponding to the transmitted audio broadcast, an input means for inputting data on the display screen, and a controlling means for selecting an audio broadcast of a music program corresponding to a music information selection command that is input on the display screen through said input means and for outputting download audio data of music information corresponding to an audio information download command that is input on the display screen through said input means, and an information storing apparatus for storing the download audio data that is output from the receiving apparatus.

The broadcasting station broadcasts a signal of which audio digital data of a plurality of audio broadcast programs, digital data for an audio information screen of a transmitted audio broadcast program, and download audio data compressed in a predetermined compressing format have been compressed. The receiving side displays a screen of audio information of a received audio broadcast program corresponding to the digital data for the audio information screen corresponding to the audio broadcast program. When an audio information designation command is input on the display screen, an audio broadcast program of a music title corresponding to the music information is selected. When an audio information download designation command is input on the display screen, download music data corresponding to the music information is output. When the download audio data is stored to an information storing device, desired music data can be downloaded. Thus, information of a broadcast music title can be easily obtained. In addition, data of a desired music title can be easily stored.

BRIEF DESCRIPTION OF THE DRAWINGS

FIG. 3 is a flow chart for explaining the example of the broadcasting system according to the first embodiment of the present invention;

FIG. 4 is a block diagram showing the structure of a ground station of the example of the broadcasting system according to the first embodiment of the present invention;

FIG. 8 is a block diagram showing the structure of an IRD of the example of the broadcasting system according to the first embodiment of the present invention;

FIG. 16 is a block diagram showing the structure of a ground station of an example of a broadcasting system according to a third embodiment of the present invention;

BEST MODES FOR CARRYING OUT THE INVENTION

In the system according to the present invention, a music program is broadcast with a digital broadcast satellite. In addition, audio data corresponding to the music program is broadcast. Thus, when the listener likes a music title that is being broadcast in the music program, he or she can buy the music title at his or her location.

Figure 1:
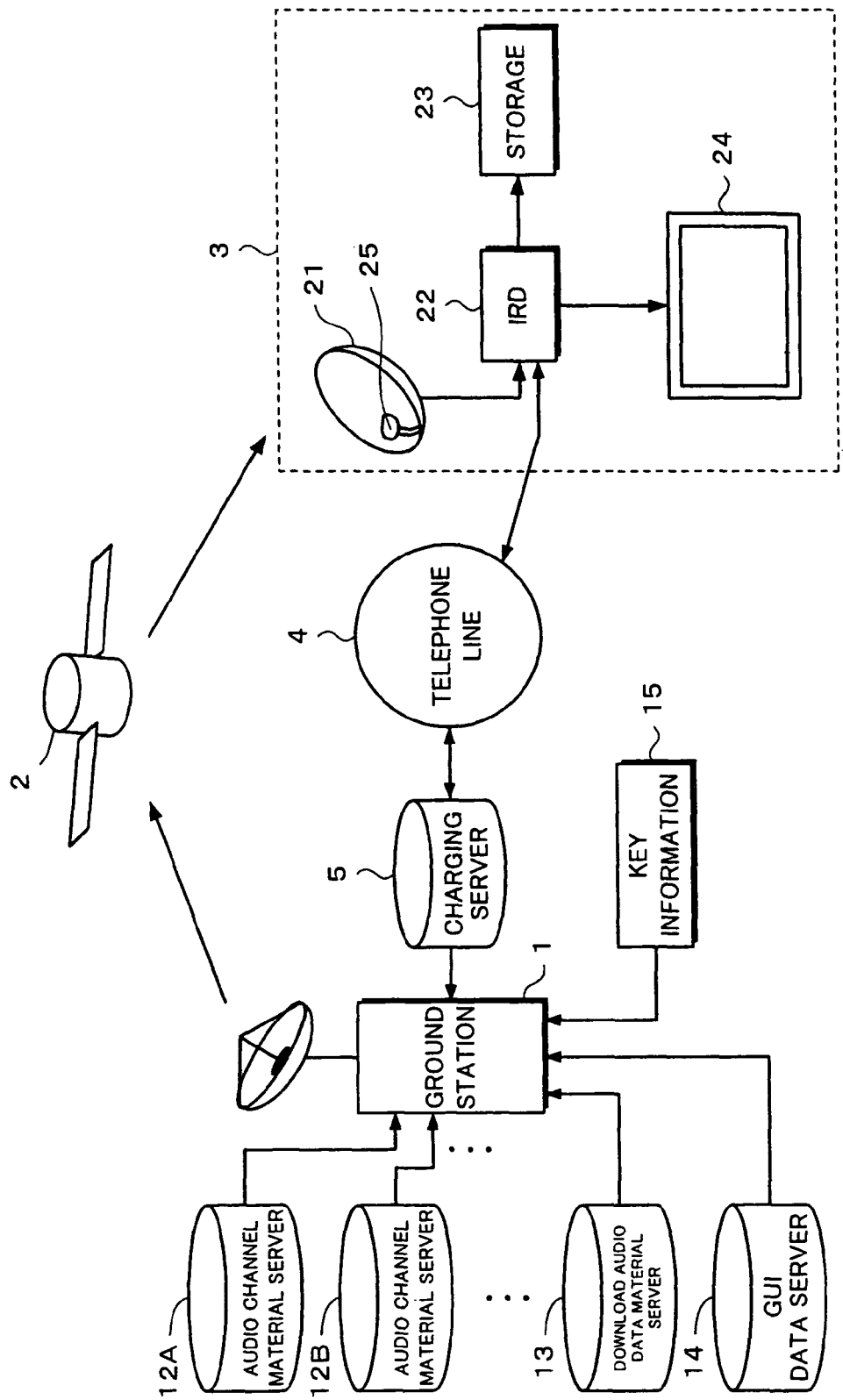
FIG. 1 is a block diagram showing the overall structure of an example of a broadcasting system according to a first embodiment of the present invention.

Next, a first embodiment of the present invention will be described. In FIG. 1, reference numeral 1 is a ground station of the satellite broadcasting system. Audio channel program broadcast material servers 12A, 12B, . . . supply audio channel materials to the ground station 1. A download audio data material server 13 supplies download data to the ground station 1. A GUI data server 14 supplies data for a graphic user interface screen to the ground station 1.

The audio channel program broadcast material servers 12A, 12B, . . . are servers that supply audio programs with respective audio channels. The audio channel program broadcast materials are only audio materials. The audio channel program broadcast material servers 12A, 12B, . . . repeatedly each broadcast the same music title in a predetermined period. The music titles that are supplied by the audio channel program broadcast material servers 12A, 12B, . . . correspond to download data thereof as will be described later. The audio channels are independent from each other. The audio channels can be used in various manners. On one channel, a recommended Japanese pop music title may be repeatedly broadcast in a predetermined period. On another audio channel, a recommended American pop music title may be repeatedly broadcast in a predetermined period. On a further audio channel, a recommended jazz music title may be repeatedly broadcast in a predetermined period. Alternatively, on a plurality of channels, a plurality of music titles of the same artist may be separately broadcast.

The download audio material server 13 supplies download audio data corresponding to a plurality of music titles that are being broadcast in the audio channel programs. As described above, it is assumed that on one channel, a recommended Japanese pop music title is repeatedly broadcast in a predetermined period. On another audio channel, a recommended American pop music title is repeatedly broadcast in a predetermined period. On a further audio channel, a recommended jazz music title is repeatedly broadcast in a predetermined period. In this case, audio data corresponding to the recommended Japanese pop music title, the recommended American pop music title, and the recommended jazz music title is supplied as download music data.

Since music titles broadcast in the audio channel programs are only guide music broadcast programs, they may contain vocal music title guides and commercial messages.

On the other hand, the download audio data does not always contain vocal music title guides and commercial messages. In other words, the download audio data is broadcast in the almost complete state. In addition, the sound quality of the download audio data is superior to that of the audio channel programs.

The GUI (Graphic User Interface) data server 14 supplies data necessary for forming a list page of music titles that are being broadcast, an information page of each music title, and an EPG (Electronic Program Guide) on a screen. As will be described later, a list of music titles whose audio data that can be downloaded and information of the music titles are displayed on the screen. The GUI data server 14 supplies such data.

The ground station 1 multiplexes audio data of audio channel materials received from the audio channel program broadcast material server 12A, 12B . . . , the download data received from the download audio data material server 13, and the data received from the GUI data server 14. At this point, the audio data on the audio channels is compressed in, for example, MPEG (Moving Picture Experts Group) audio format. The download audio data is compressed in, for example, ATRAC (Adaptive Transform Acoustic Coding) 2 format. In addition, the download audio data is encrypted with key information received from a key information server 15. In addition, the data received from the GUI data server is encoded in MHEG 5. (Multimedia and Hyperimedia Information Coding Experts Group Phase 5) format. The multiplexed signal is scramble-QPSK modulated and transmitted.

The signal broadcast from the ground station 1 is received by a home receiving facility 3 through a satellite 2. The satellite 2 has a plurality of transponders. One transponder has a transmission capacity of, for example, 30 Mbps.

The home receiving facility 3 has a parabola antenna 21, an IRD 22 (Integrated Receiver Decoder), a storage device 23, and a television receiver 24. The parabola antenna 21 receives a signal from the ground station through the satellite 2. The received signal is supplied to an LNB (Low Noise Block Down-converter) 25 disposed in the parabola antenna 11. The output signal of the LNB 25 is supplied to the IRD 22.

The IRD 22 selects a signal of a predetermined channel from the received signal and demodulates/decodes the selected signal to a video signal and an audio signal. In addition, the IRD 22 performs a displaying process for a list page of broadcast music titles, an information page of each music title, and an EPG corresponding to the received GUI data. An output signal of the IRD 22 is supplied to the television receiver 24.

The storage device 23 stores download audio data. Examples of the storage device 23 are an MD recorder/player, a DCC recorder/player, a DAT recorder/player, and a DVD recorder/player. Alternatively, as the storage device 23, a personal computer may be used. Audio data may be stored in a hard disk drive or a CD-R.

The IRD 22 is connected to a charging server 5 through, for example, a telephone line 4. An IC card that records various types of information is inserted into the IRD 22. When audio data is downloaded, relevant information is recorded to the IC card. The information recorded to the IC card is supplied to the charging server 5 through the telephone line 4. The charging server 5 charges the listener for the download audio data corresponding to the download information. Since the listener is accurately charged for the download audio data, the copyright of the music title can adequately be protected.

As described above, in the system according to the present invention, the ground station 1 multiplexes audio data of materials of audio channels received from the audio channel program broadcast material servers 12A, 12B, . . . , download data received from the download audio data material server 13, and data received from the GUI data server 14 and broadcasts the multiplexed signal.

When the home receiving facility 3 receives the broadcast signal, a graphic screen is displayed corresponding to data received from the GUI data server. When the listener performs a required operation while seeing the graphic screen, he or she can see an information page of each music title. In addition, the user can listen to a demo of each music title. When the listener performs a required operation while seeing a graphic screen, he or she can download audio data corresponding to a desired music title and record it to the storage device.

Figures 2A, 2B:
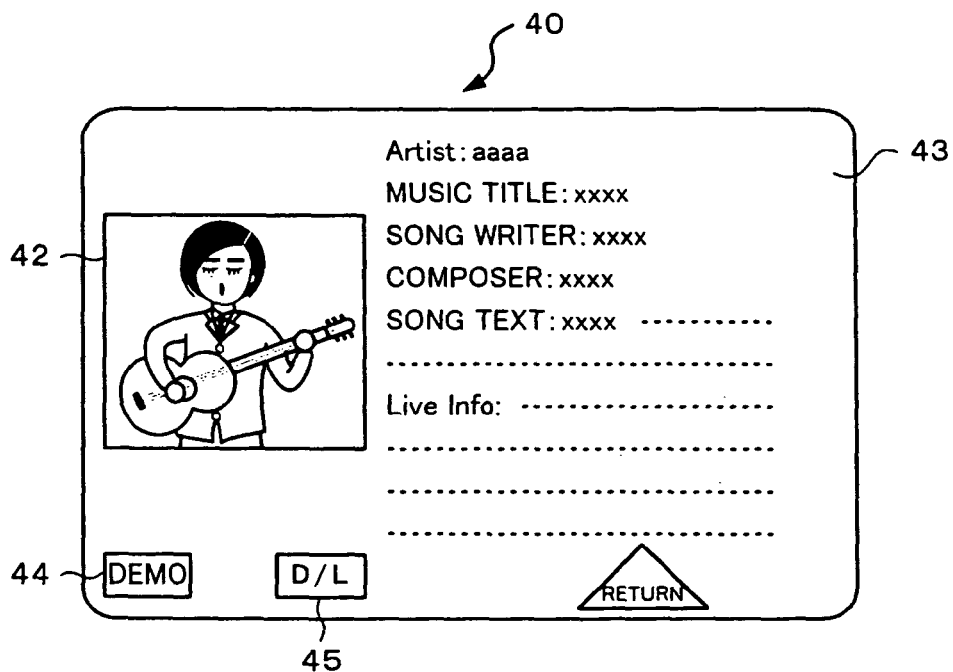
FIGS. 2A and 2B are schematic diagrams for explaining display screens of the example of the broadcasting system according to the first embodiment of the present invention.

In other words, when the home receiving facility 3 receives the broadcast signal, as shown in FIG. 2A, a list page 30 of broadcast music titles is displayed on the screen. The list page 30 shows artist names 33, 33, . . . , and downloadable music titles 34, 34, 34, . . . The list page 30 also shows selection buttons 35, 35, 35, . . . of the individual music titles.

The listener can look for a desired music title while seeing music titles on the list page 30. When the listener wants to see detailed information of each music title, he or she presses a selection button 35 for the desired music title using arrow keys of, for example, a remote commander.

When the listener presses the selection button 35 corresponding to the desired music title, as shown in FIG. 2B, an information page 40 of the designated music title is displayed. The information page 40 of each music title shows a still picture 42 such as a jacket of a CD that contains the relevant music title. The information page 40 also shows detail information 43 of the music title such as an artist name, a music title, a song writer, a composer, a song text, and live information. In addition, the information page 40 shows a demo button 44, a download button 45, and a return button 46.

The demo button 44 is a button that allows the listener to listen to a demo of a desired music title. Thus, before buying audio data of a desired music title, the listener can listen to its demo. The download button 45 is a button that allows the listener to download the audio data corresponding to the music title and record it to the storage device 23. The return button 46 is a button that allows the listener to see the preceding page on the screen.

Thus, with the list page 30 of the broadcast music titles and the information page 40 of each music title, the listener can know what music titles are being broadcast. In addition, the listener can know detail information of each music title. The list page 30 and the information page 40 are displayed corresponding to the received GUI data. The GUI data contains data that defines the display position of the still picture 42 on the screen, the display position of text, font type and font size, and display positions of individual buttons, still picture data, and bit map data of individual buttons.

When the listener wants to listen to a demo of a desired music title, he or she presses a demo button using the keys of the remote commander. When the listener presses the demo button 44, an audio channel corresponding to the designated music title is selected. On each audio channel, the same music title is repeatedly broadcast in a predetermined period. When the demo button 44 is pressed, the audio channel corresponding to the music title is selected. Thus, the listener can listen to a demo of the music title while seeing the same screen.

When the listener wants to buy audio data corresponding to the music title, he or she presses the download button 45. As described above, the download audio data corresponds to the music title that is being broadcast on the relevant audio channel. Thus, when the download button 45 is pressed, the audio data corresponding to the selected music title is downloaded and recorded to the storage device 23.

To return to the list page, the listener presses the return button 46. When the return button 46 is pressed, the list screen 30 shown in FIG. 2A is displayed.

Thus, in the system according to the present invention, the list page 30 of the music titles and the information page 40 of each music program are displayed. With the list page 30 of the music titles and the information page 40 of each music title, the listener can know information of each music title. When the listener presses the demo button 44 corresponding to the information displayed on the screen, he or she can listen to a demo of the selected music title. When the listener presses the download button 45, he or she can download the audio data corresponding to the selected music title and record it to the storage device 23.

FIG. 3 is a flow chart showing a process performed in the above-described operations. As shown in FIG. 3, when a broadcast signal is received, a list page 30 of broadcast music titles is displayed (at step S1). Thereafter, it is determined whether or not the music title selection button 35 has been pressed (at step S2).

When the determined result at step S2 is No (namely, the music title selection button 35 has not been pressed), the flow returns to step S1. When the determined result at step S2 is Yes, the information page 40 of the selected music title is displayed (at step S3).

After the information page 40 of the selected music title is displayed, it is determined whether or not the return button 46 has been pressed (at step S4). When the determined result at step S4 is Yes (namely, the return button 46 has been pressed), the flow returns to step S1.

When the determined result at step S4 is No (namely, the return button 46 has not been pressed), it is determined whether or not the demo button 44 has been pressed (at step S5). When the determined result at step S5 is Yes (namely, the demo button 44 has been pressed), an audio channel corresponding to the selected music title is selected (at step S6). On each audio channel, the same music title is repeatedly broadcast in a predetermined period. Thus, when the demo button 44 is pressed, the listener can listen to a demo of the selected music title (at step S7). Thereafter, the flow returns to step S4.

When the determined result at step S5 is No (namely, the demo button 44 has not been pressed), it is determined whether or not the download button 45 has been pressed (at step S8). When the determined result at step S8 is No (namely, the download button 45 has not been pressed), the flow returns to step S4.

When the determined result at step S8 is Yes(namely, the download button 45 has been pressed), the audio data corresponding to the selected music title is downloaded (at step S9). After the audio data corresponding to the selected music title has been completely downloaded (at step S10), a charging process for the downloaded audio data is performed (at step S11). Thereafter, the flow returns to step S4.

Thus, in the system according to the present invention, music titles are broadcast on a plurality of audio channels. In addition, download audio data corresponding to the music titles is broadcast. With a list page of broadcast music titles and an information page of each music title, while looking for information of each music title, the listener can easily store audio data corresponding to a desired music title to the storage device. Next, such a system will be described in detail.

FIG. 4 is a block diagram showing the structure of the ground station 1 of the system according to the present invention.

In FIG. 4, audio data is supplied from audio channel program broadcast material servers 12A, 12B, . . . to MPEG audio encoders 52A, 52B, . . . , respectively. Download audio data is supplied from a download audio data material server 13 to an ATRAC 2 encoder 53. Data for a graphic user interface screen is supplied from a GUI data server 14 to a GUI data authoring circuit 54.

The MPEG audio encoders 52A, 52B, 52C, . . . compress audio data received from the audio channel program broadcast material servers 12A, 12B, . . . in MPEG audio format and output audio packets. The audio packets are supplied to a multiplexer 57.

The ATRAC 2 encoder 53 compresses download audio data received from the download audio data material server 13 in ATRAC 2 format and outputs data packets. The data packets are supplied to an encrypting circuit 55. The encrypting circuit 55 encrypts the data packets. An output signal of the encrypting circuit 55 is supplied to a multiplexer 57. The audio data is encrypted so as to prevent it from being illegally downloaded and thereby protect the copyright of the audio data. At this point, information for decrypting encrypted data is supplied from an encryption information generating circuit 56 to the multiplexer 57.

The GUI data authoring circuit 54 processes the data for the graphic user interface screen (the data being received from the GUI data server 14) and outputs data packets. The data packets are supplied to the multiplexer 57.

The multiplexer 57 multiplexes audio packets received from the MPEG audio encoders 52A, 52B, 52C, . . . , data packets received from the ATRAC 2 encoder 53 through the encrypting circuit 55, encryption information received from the encryption information generating circuit 56, and data packets received from the GUI data authoring circuit 54. An output signal of the multiplexer 57 is supplied to a scramble processing circuit 58. The scramble processing circuit 58 performs a predetermined scrambling process for the output signal of the MUX 57. An output signal of the scramble processing circuit 58 is supplied to a QPSK modulating circuit 59. The QPSK modulating circuit 59 QPSK-modulates transmission data. An output signal of the QPSK modulating circuit 59 is supplied to a radio frequency circuit 60. The radio frequency circuit 60 converts a carrier frequency into a predetermined frequency and amplifies the power of the transmission signal. An output signal of the radio frequency circuit 60 is transmitted from an antenna 61 to a satellite 2.

Thus, in the ground station 1, audio data on audio channels is compressed in MPEG audio format. In addition, download audio data is compressed in ATRAC 2 format. The compressed audio data, the compressed download data, and the GUI data are multiplexed and transmitted.

Figure 5:
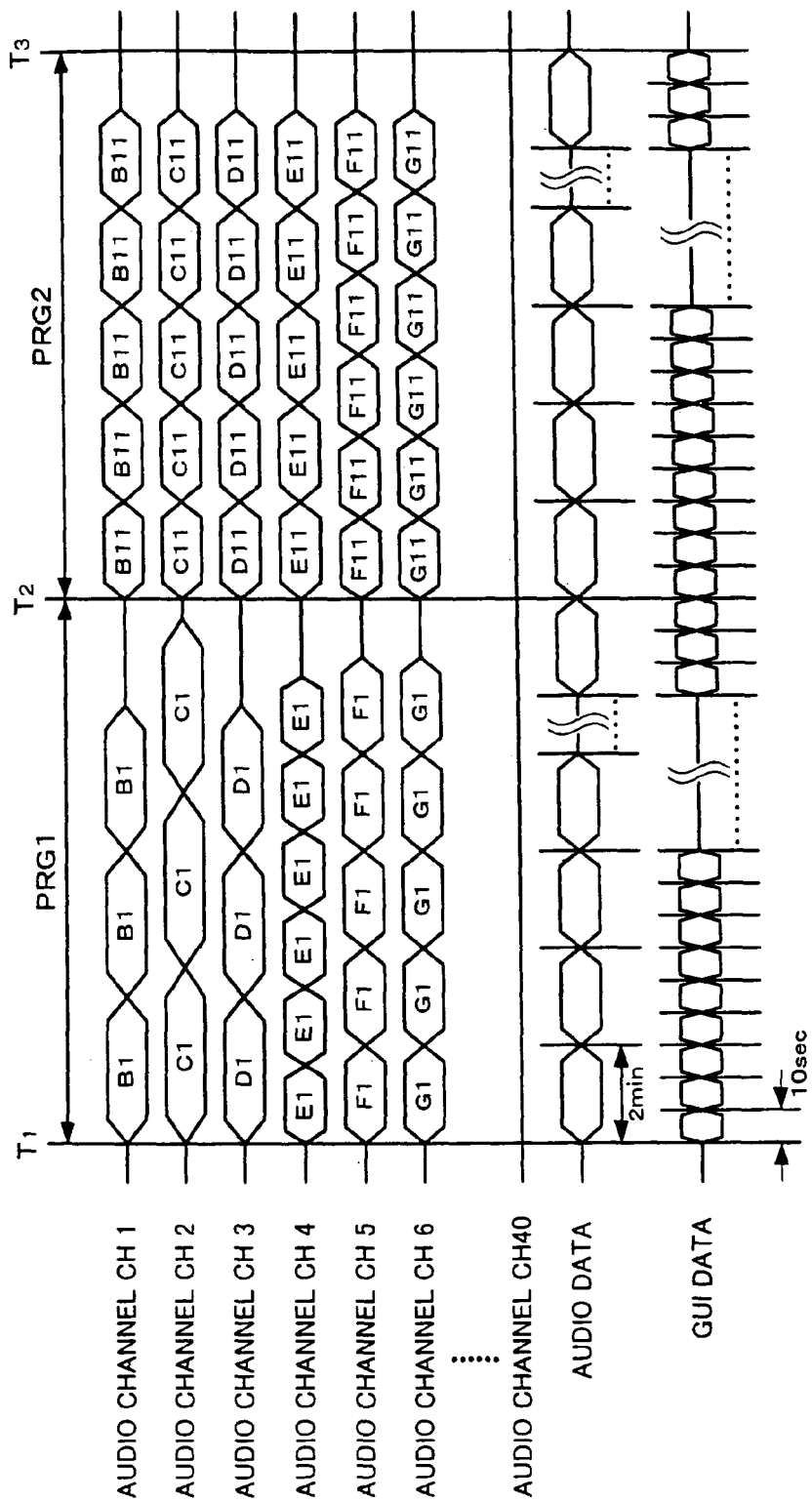
FIG. 5 is a timing chart for explaining the example of the broadcasting system according to the first embodiment of the present invention.

FIG. 5 shows an example of data transmitted from the ground station 1. As shown in FIG. 5, a program PRG1 is transmitted in a period from time T1 to time T2. Likewise, a program PRG2 is transmitted in a period from time T2 to time T3. The period of each of the programs PRG1 and PRG2 is normally 30 minutes or one hour.

The number of audio channels is, for example, 40 channels from CH1 to CH40. On each audio channel CH1, CH2, CH3, . . . , in each program PRG1 or PRG2, the same music title is repeatedly transmitted. In other words, in program PRG1 from time T1 to time T2, on audio channel CH1, music title B1 is repeatedly transmitted. On audio channel CH2, music title C1 is repeatedly transmitted. On audio channel CH3, music title D1 is repeatedly transmitted. In program PRG2, on audio channel CH1, music title B11 is repeatedly transmitted. On audio channel CH2, music title C11 is repeatedly transmitted. On audio channel CH3, music title D11 is repeatedly transmitted.

Download audio data is transmitted in the unit of two minutes. In two minutes, download audio data corresponding to 40 music titles is transmitted. As the download audio data, data on audio channels CH1, CH2, CH3, . . . , and CH40 is transmitted.

In other words, in program PRG1 from time T1 to time T2, audio data corresponding to 40 music titles (music title B1, music title C1, music title D1, . . . ) is transmitted on audio channels CH1, CH2, CH3, . . . , and CH40, respectively, in, for example, two minutes. In program PRG2 from time T2 to time T3, audio data corresponding to 40 music titles (music title B11, music title C11, music title D11, . . . ) is time-axis compressed and transmitted on audio channels CH1, CH2, CH3, . . . , and CH40, respectively, in, for example, two minutes.

Download audio data is transmitted in the unit of, for example, two minutes. GUI data for displaying a list page of download audio data and a music title selection page is transmitted in the unit of 10 seconds.

As shown in FIG. 5, in programs PRG1 and PRG2, data of a plurality of audio channels, download audio data, and GUI data are multiplexed and transmitted. Thus, when the bit rate of one audio channel is denoted by $B_1$, the number of audio channels is denoted by n, the bit rate of download audio data is denoted by $B_2$, and the bit rate of the GUI data is denoted by $B_3$, the total bit rate $B_A$ can be expressed as follows.

$$B_A = n \cdot B_1 + B_2 + B_3$$

When the bit rate $B_1$ of each of audio channels CH1, CH2, CH3, . . . is 256 kbps and the number of channels n is 40, the following relation is obtained.

$$n \cdot B_1 = 256 \text{ kbps} \times 40 = 10.2 \text{ Mbps}$$

It is assumed that the bit rate of the download audio data compressed in ATRAC 2 format is 128 kbps, that the period of download audio data per music title is five minutes, and that the download audio data of 40 music titles is transmitted in two minutes. In this case, the bit rate $B_2$ of the download audio data can be expressed as follows.

$$B_2 = 128 \text{ kbps} \times 40 \text{ music titles} \times 5 \text{ minutes} \times 60 \text{ seconds}/120 \text{ seconds} = 12.8 \text{ Mbps}$$

It is assumed that the bit rate of GUI data per music title is 200 kbytes and that the GUI data for 40 music titles is transmitted in 10 seconds.

In this case, the bit rate $B_3$ of CGI data can be expressed as follows.

$$B_3 = 200 \text{ kbytes} \times 40 \text{ music titles} \times 8 \text{ bits}/10 \text{ seconds}$$
$$= 6.4 \text{ Mbps}$$

Thus, the total bit rate $B_A$ can be expressed as follows.

$$B_A = n \cdot B_1 + B_2 + B_3$$
$$= 10.24 \text{ Mbps} + 12.8 \text{ Mbps} + 6.4 \text{ Mbps}$$
$$= 29.44 \text{ Mbps}$$

When the bit rate of one transponder of the satellite 2 is 30 Mbps, data of all channels, download audio data, and GUI data can be transmitted with one transponder of the satellite 2.

Next, the home receiving facility 3 will be described. As shown in FIG. 1, the home receiving facility 3 is composed of the parabola antenna 21, the IRD 22, the storage device 23, and the television receiver 24. Examples of the storage device 23 are an MD recorder/player, a DCC recorder/player, a DAT recorder/player, and a DVD recorder/player.

Thus, the storage device 23 may input only an analog audio signal. The storage device 23 may directly input PCM audio data. The storage device 23 may directly input audio data compressed in, for example, ATRAC 2 format.

Figure 6A:
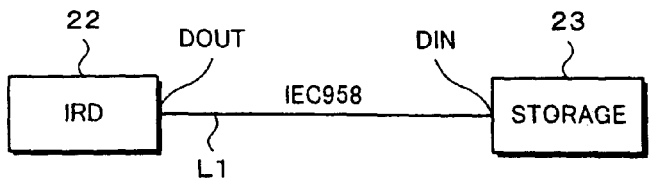
FIGS. 6A, 6B, and 6C are block diagrams for explaining connections of an IRD and a storage device of the example of the broadcasting system according to the first embodiment of the present invention.

In other words, as shown in FIG. 6A, the storage device 23 may be an MD recorder/player, a DAT recorder/player, or a DCC recorder/player that has a digital input terminal DIN corresponding to IEC 958 standard of which audio data is transmitted with an optical cable. In this case, a digital output terminal DOUT of the IRD 22 is connected to a digital input terminal DIN of the storage device 23 with an optical fiber L1 corresponding to, for example, IEC 958 standard. The IRD 22 performs an ATRAC 2 decompressing process for download audio data and outputs PCM audio data. The PCM audio data is supplied to the storage device 23 through the IEC 958 optical cable.

Figure 6B:
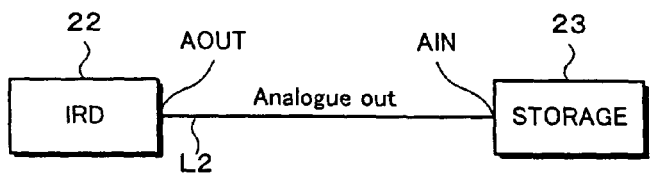

As shown in FIG. 6B, the storage device 23 may be an MD recorder/player, a DAT recorder/player, a DCC recorder/player, or a compact cassette recorder/player that does not have a digital input terminal. In this case, an analog output terminal AOUT of the IRD 22 is connected to an analog input terminal AIN of the storage device 23 with a cable L2. The IRD 22 performs an ATRAC 2 decompressing process for download audio data and performs a D/A converting process. The resultant analog data is output from the analog audio output terminal AOUT of the IRD 22 to the storage device 23 through the cable L2.

Figure 6C:
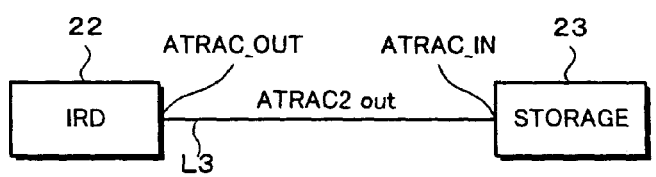

As shown in FIG. 6C, the storage device 23 may have a data terminal ATRAC_IN from which data compressed in ATRAC 2 format can be directly input. In this case, an output terminal ATRAC_OUT of the IRD 22 is connected to an input terminal ATRAC_IN of the ATRAC 2 of the storage device 23 with, for example, an optical fiber L3 corresponding to, for example, IEC 958 standard. In this case; ATRAC 2 audio data is directly output from the IRD 22 to the storage device 23 through the IEC 958 optical cable.

Thus, the storage device 23 may input PCM audio data, analog data, or ATRAC 2 data. In addition, the storage device 23 may have a terminal from which an external control signal is input and the operation state of the storage device 23 is controlled corresponding thereto. In this case, a control signal is exchanged between the IRD 22 and the storage device 23. With a control signal received from the IRD 22, download audio data can be automatically recorded to the storage device 23.

Figure 7A:
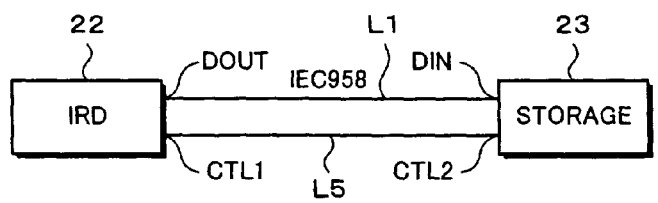
FIGS. 7A, 7B, 7C, and 7D are block diagrams for explaining connections of an IRD and a storage device of the example of the broadcasting system according to the first embodiment of the present invention.

In other words, as shown in FIG. 7A, when the storage device 23 is, for example, an MD recorder/player, a DAT recorder/player, or a DCC recorder/player that has a digital input terminal DIN corresponding to, for example, IEC 958 standard (of which audio data is supplied with an optical fiber) and an input/output terminal CTL2 for a control signal, a digital output terminal DOUT of the IRD 23 is connected to a digital input terminal DIN of the storage device 23 with an optical cable L1. In addition, a control signal input/output terminal CTL1 of the IRD 22 is connected to a control signal input/output terminal CTL2 of the storage device 23 with a cable L5. Thus, a control signal is exchanged between the IRD 22 and the storage device 23. When audio data is downloaded, corresponding to a control signal received from the IRD 22, the storage device 23 is placed in record mode. The IRD 22 performs an ATRAC 2 decompressing process for the download audio data and outputs PCM audio data to the storage device 23 through the cable L1.

Figure 7B:
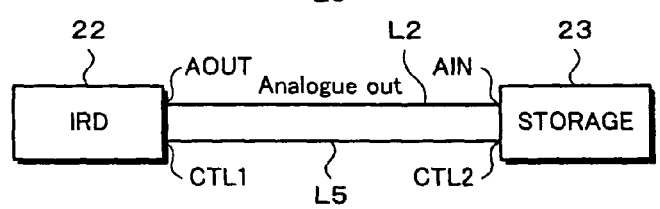

As shown in FIG. 7B, when the storage device 23 is, for example, an MD recorder/player, a DAT recorder/player, or a DCC recorder/player that does not has a PCM input terminal and that has an input/output terminal CTL2 for a control signal, an analog output terminal AOUT of the IRD 23 is connected to an analog input terminal AIN of the storage device 23 with a cable L2. In addition, a control signal input/output terminal CTL1 of the IRD 22 is connected to a control signal input/output terminal CTL2 of the storage device 23 with a cable L5. Thus, a control signal is exchanged between the IRD 22 and the storage device 23. When audio data is downloaded, corresponding to a control signal received from the IRD 22, the storage device 23 is placed in record mode. The IRD 22 performs an ATRAC 2 decompressing process for the download audio data and performs a D/A converting process. The resultant analog audio signal is supplied to the storage device 23 through the cable L2.

Figure 7C:
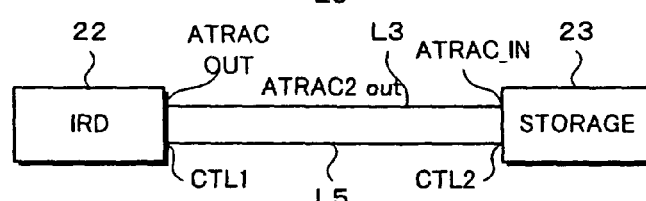

As shown in FIG. 7C, when the storage device 23 is, for example, an MD recorder/player, a DAT recorder/player, or a DCC recorder/player that has an input terminal ATRAC_IN corresponding to ATRAC 2 format and that has an input/output terminal CTL2 for a control signal, an ATRAC 2 output terminal ATRAC_OUT of the IRD 23 is connected to an ATRAC 2 input terminal ATRAC_IN of the storage device 23 with an optical cable L3. In addition, a control signal input/output terminal CTL1 of the IRD 22 is connected to the control signal input/output terminal CTL2 of the storage device 23 with a cable L5. Thus, a control signal is exchanged between the ID 22 and the storage device 23. When audio data is downloaded, corresponding to a control signal received from the ID 22, the storage device 23 is placed in record mode. The IRD 22 directly supplies the download audio data corresponding to ATRAC 2 format to the storage device 23 through the cable L3.

Figure 7D:
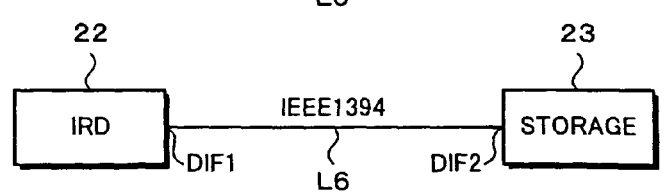

As shown in FIG. 7D, when the storage device 23 is, for example, an MD recorder/player, a DAT recorder/player, or a DCC recorder/player that has a digital interface DIF2 corresponding to, for example, IEEE 1394 standard, the digital interface DIF1 of the IRD 22 is connected to the digital interface DIF2 of the storage device 23 with a cable L6. In this case, while a signal is exchanged between the IRD 22 and the storage device 23, the downloaded audio data can be supplied from the IRD 2 to the storage device 23.

In the above description, the recording method of audio data to the storage device 23 has not been mentioned. In particular, in the storage devices shown in FIGS. 6C, 7C, and 7D, since ATRAC 2 data is input, it is preferable to record data that has been compressed in ATRAC 2 format. In other words, when compressed data is recorded, since the ATRAC 2 decoding process or the like is not required, in the broadcasting format shown in FIG. 5, downloaded audio data corresponding to music titles can be stored to the storage device 23 in two minutes.

FIG. 8 shows an example of the structure of the IRD 22. In FIG. 8, a parabola antenna 21 receives a digital satellite broadcast signal from a satellite 2. The received signal is supplied from the parabola antenna 21 to an LNB 25 disposed in the parabola antenna 22. The LNB 25 down-converts the frequency of the received signal into a predetermined frequency.

An output signal of the LNB 25 is supplied to a tuner circuit 71. The tuner circuit 71 selects a signal with a predetermined frequency from the received signal corresponding to a setup signal received from the controller 76.

An output signal of the tuner circuit 71 is supplied to a QPSK demodulating circuit 72. The QPSK demodulating circuit 72 QPSK demodulates the received signal into a bit stream. An output signal of the QPSK demodulating circuit 72 is supplied to an error correcting circuit 73. The error correcting circuit 73 detects and corrects an error of the output signal of the QPSK demodulating circuit 72.

An output signal of the error correcting circuit 73 is supplied to a descrambler and demultiplexer 74. The descrambler and demultiplexer 74 receives the bit stream signal from the error correcting circuit 73, descrambles the received signal, and temporarily stores the resultant signal to a data buffer memory 75. Thereafter, the descrambler and demultiplexer 74 frames the descrambled signal into a sequence of packets, determines whether or not each packet is desired data, and demultiplexes each packet.

The ground station 1 transmits video data and audio data of conventional broadcast programs, audio data of a plurality of channels, download audio data, and GUI data. The video data has been compressed in MPEG 2 format. The audio data has been compressed in MPEG audio format. The download audio data has been compressed in ATRAC 2 format.

The demultiplexer 74 demultiplexes the received packets into video data and audio data, download audio data, and GUI data.

The video data demultiplexed by the demultiplexer 74 is supplied to an MPEG 2 video decoder 78. The MPEG 2 video decoder 78 appropriately stores the input digital video signal to the buffer memory 79 and decodes the video signal that has been compressed in MPEG 2 format. The MPEG 2 video decoder 78 decodes a component video signal.

An output signal of the MPEG 2 video decoder 78 is supplied to a video encoder 80 corresponding to, for example, NTSC standard. The analog video encoder 80 forms a composite video signal corresponding to, for example, NTSC standard with a component video signal. The resultant video signal is obtained from an output terminal 81.

Audio data of conventional TV programs and audio data of audio channels are supplied to an MPEG audio decoder 82. The MPEG audio decoder 82 appropriately stores an input digital audio signal to a buffer memory 83 and decodes the digital audio signal.

An output signal of the MPEG audio decoder 82 is supplied to a D/A converter 84. The D/A converter 84 converts a digital audio signal into an analog audio signal. An output signal of the D/A converter 84 is obtained from an output terminal 85.

The download audio data is temporarily stored in a buffer memory 86. An output signal of the buffer memory 86 is supplied to a decrypting circuit 87. As was described above, the download audio data has been encrypted. A decryption key is generated from an IC card 88.

Information that represents that audio data has been completely downloaded is supplied from the buffer memory 86 to a gate circuit 89. In addition, information necessary for decrypting encrypted data is supplied from the demultiplexer 74 to the gate circuit 89.

When audio data is downloaded, it is stored in the buffer memory 86. At this point, the gate circuit 89 becomes open and causes the information necessary for decrypting encrypted data to be supplied to the IC card 88. Thus, the IC card 88 supplies the decrypting key to the decrypting circuit 87. The decrypting circuit 87 decrypts encrypted data with the decrypting key received from the IC card 88. At this point, charging information is stored in the IC card 88.

An output signal of the decrypting circuit 87 is supplied to an ATRAC 2 decoder 90 and a terminal 91B of a switch circuit 91. The ATRAC 2 decoder 90 performs the ATRAC 2 decoding process and outputs a PCM audio signal. The PCM audio signal is supplied to an input terminal 91A of the switch circuit 91.

The switch circuit 91 is controlled by a controller 76. When the switch circuit 91 is placed on the terminal 91A side, the switch circuit 91 outputs a PCM audio signal. When the switch circuit 91 is placed on the terminal 91B side, the switch circuit 91 outputs a digital audio signal that has been compressed in ATRAC 2 format.

An output signal of the switch circuit 91 is supplied to a water mark adding circuit 92. The water mark adding circuit 92 adds an electronic water mark to audio data so as to protect the copyright of the audio data.

An output signal of the water mark adding circuit 92 is supplied to a digital signal output terminal 93 and a D/A converter 94. The D/A converter 94 converts a digital audio signal into an analog audio signal. The resultant analog audio signal is obtained from an output terminal 95. The digital signal output terminal 93 outputs a digital audio signal (with a water mark) in IEC 958 format.

The GUI data demultiplexed by the demultiplexer 74 is supplied to the controller 76. The controller 76 generates a list page and an information page of each music title corresponding to the GUI data. The data of the list page and the information page is written to a particular area of the buffer memory 79. Thus, the list page of music titles that are broadcast and the information page of each music title can be displayed on the screen.

The controller 76 controls all processes of the IRD 22. Data is input to the controller 76 through an input key pad 98. A modem 99 is connected to the controller 76. Information necessary for charging audio data is recorded to the IC card 88. Information recorded to the IC card 88 is transmitted to a charging server 5 (see FIG. 1) by the controller 76 and the modem 99 through a telephone line 4.

The IRD 22 also has a control signal input/output terminal 97. The control signal input/output terminal 97 is connected to the controller 76. A control signal is exchanged between the storage device 23 and the controller 76 through the control terminal 96.

The IRD 22 also has a digital interface 96 corresponding to IEEE 1394 standard. An output signal of the water mark adding circuit 92 is obtained from the digital interface 96. In addition, a control signal is exchanged with the controller 76 through the digital interface 96.

Thus, the IRD 22 has the output terminal 95 for outputting an analog audio signal (the output terminal 95 corresponds to the output terminal AOUT shown in FIG. 6), the data output terminal 93 corresponding to IEC 958 standard for outputting PCM audio data or ATRAC 2 compressed audio data (the data output terminal 93 corresponds to the output terminal DOUT or ATRAC_OUT shown in FIG. 6), the digital interface 96 corresponding to IEEE 1394 standard (the digital interface 96 corresponds to the digital interface DIF1 shown in FIG. 7), and the control signal input/output terminal 97 (that corresponds to the control signal input/output terminal CTL1 shown in FIG. 7).

When the storage device 23 has only the analog audio input terminal AIN, the analog audio signal output terminal 95 is used to connect the IRD 22 and the storage device 23.

When the storage device 23 has a PCM signal digital input terminal DIN, the data output terminal 93 is used to connect the IRD 22 and the storage device 23. At this point, the storage circuit 91 is placed on the terminal 91A side.

When the storage device 23 has the ATRAC data input terminal ATRAC_IN, the digital signal output terminal 93 is used to connect the IRD 22 and the storage device 23. At this point, the switch circuit 91 is placed on the terminal 91B side.

When the storage device 23 has the control signal input/output terminal CTL2, the storage device 23 exchanges data with the control signal input/output terminal CTL2.

When the storage device 23 has the digital interface DIF2 corresponding to IEEE 1394 standard, the digital interface 96 of the IRD 22 is connected to the digital interface DIF2 of the storage device 23. Audio data and a control signal are exchanged between the IRD 22 and the storage device 23.

Thus, the digital signal output terminal 93 is shared with PCM data and ATRAC 2 audio data and is switched over by the switch circuit 91.

In other words, when the storage device 23 has the PCM data digital input terminal DIN, the switch circuit 91 is placed on the terminal 91A side. When the storage device 23 has the terminal ATRAC_IN, the switch circuit 91 is placed on the terminal 91B side. When the switch circuit 91 is placed on the terminal 91A side, downloaded ATRAC 2 data is supplied to the ATRAC 2 decoder 90. The ATRAC 2 decoder 90 decodes the downloaded ATRAC 2 data. The decoded data is obtained from the data output terminal 93 through the switch circuit 91 and the water mark adding circuit 92. When the switch circuit 91 is placed on the terminal 91B side, downloaded ATRAC 2 data is obtained from the data output terminal 92 through the switch circuit 91 and the water mark adding circuit 92.

In the above-described example, download audio data has been compressed in ATRAC 2 format. However, the compressing format of the present invention is not limited to ATRAC 2 format. In other words, another compressing format, for example, ATRAC format can be used.

As described above, in the system according to the present invention, in addition to conventional music programs, music titles are broadcast on a plurality of audio channels. Moreover, download audio data and GUI data are broadcast. On audio channels, the same music title is repeatedly broadcast in a predetermined period. Thus, the listener can select a desired music title and download audio data corresponding to the selected music title to the storage device.

Figure 9:
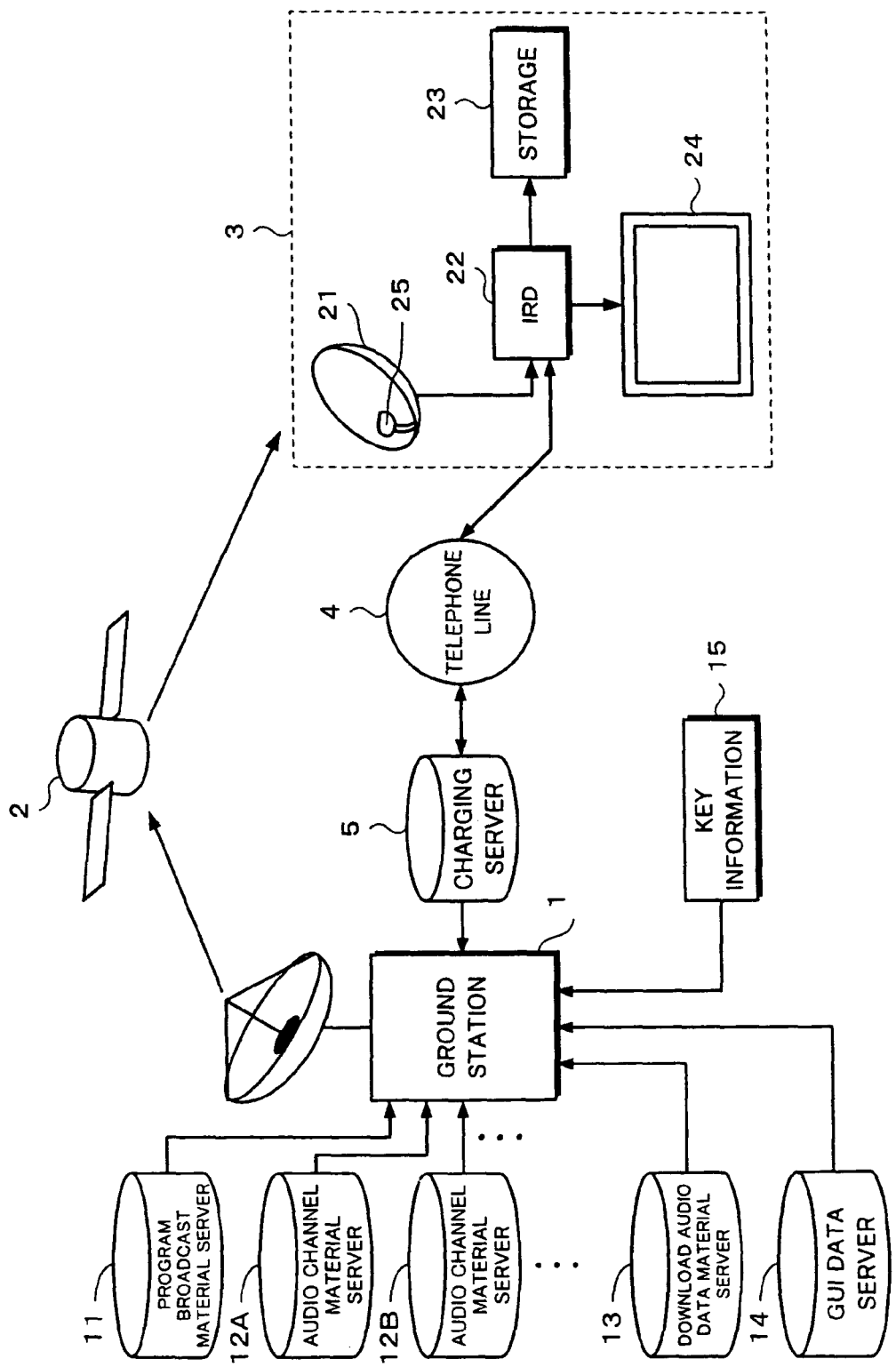
FIG. 9 is a block diagram showing the overall structure of an example of a broadcasting system according to a second embodiment of the present invention.
Figure 10:
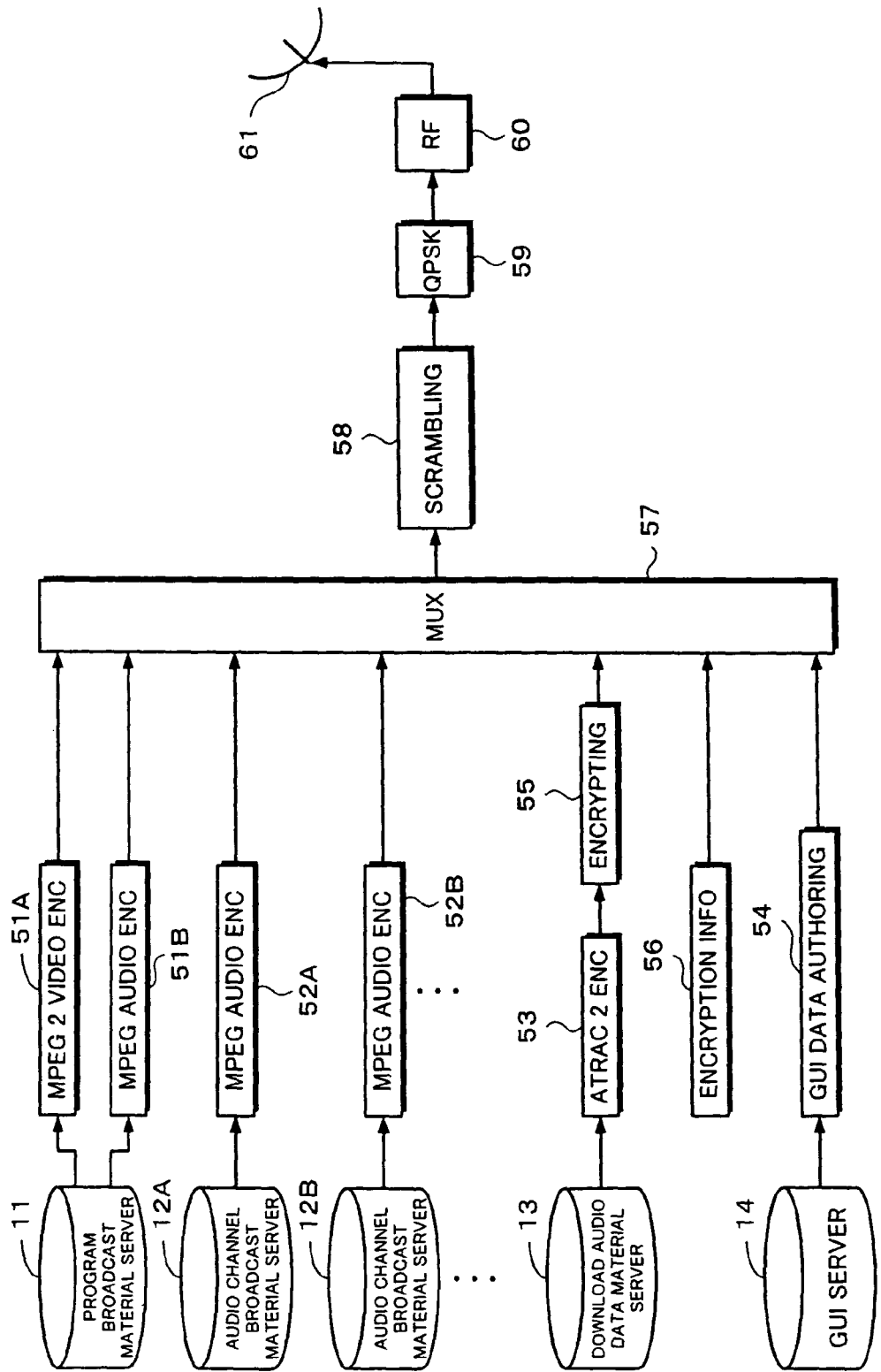
FIG. 10 is a block diagram showing the structure of a ground station of the example of the broadcasting system according to the second embodiment of the present invention.
Figure 11:
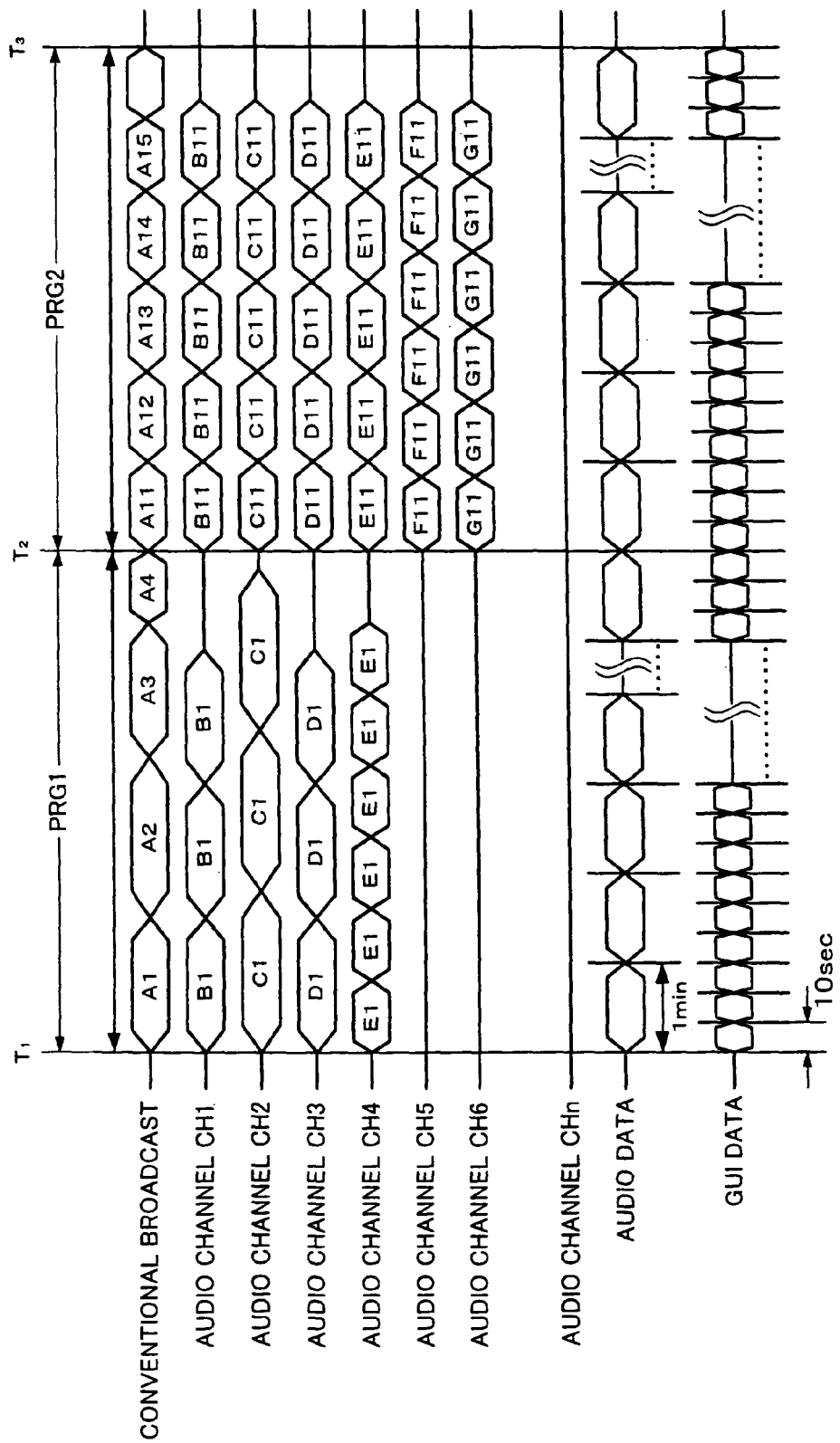
FIG. 11 is a timing chart for explaining the example of the broadcasting system according to the second embodiment of the present invention.

Next, with reference to FIGS. 9, 10, and 11, a second embodiment of the present invention will be described. In FIGS. 9 to 11, blocks similar to those in FIGS. 1, 4, and 5 are denoted by similar reference numerals. In the first embodiment, pictures are not broadcast. However, in the second embodiment, pictures corresponding to audio channels are also broadcast. In other words, while a music TV program is being broadcast, music titles corresponding to the music TV program are broadcast on audio channels. In addition, audio data corresponding to music titles broadcast on the audio channels can be downloaded.

FIG. 9 shows the overall structure of a system according to the second embodiment. In FIG. 9, a program broadcast material server 11 is added to the structure shown in FIG. 1. The other portions of the structure shown in FIG. 9 are the same as those shown in FIG. 1. The program broadcasting server 11 is a server that supplies a conventional music TV program material. Music broadcast materials supplied from the program broadcast material server 11 are moving pictures and sound. In conventional music broadcast programs, new music title guide promotion video programs and the latest hit chart count down programs are broadcast.

FIG. 10 shows the structure of a ground station 1 according to the second embodiment. In FIG. 10, a program broadcast material server 11, an MPEG 2 video encoder 51A, and an MPEG audio encoder 51B are added to the structure shown in FIG. 4. Video data received from the program broadcast material server 11 is supplied to the MPEG 2 video encoder 51A and the MPEG audio encoder 51B. A video signal received from the program broadcast material server 11 is compressed and packetized by the MPEG 2 video encoder 51A. The resultant video packets are supplied to a multiplexer 57. An audio signal received from the program broadcast material server 11 is compressed and packetized by the MPEG audio encoder 51B. The resultant audio packets are supplied to the multiplexer 57. The other processes performed in the ground station 1 are the same as those shown in FIG. 4.

FIG. 11 shows an example of data transmitted from the ground station 1 according to the second embodiment. In FIG. 11, music broadcast data is added to the data shown in FIG. 5. As shown in FIG. 11, a program PRG1 from time T1 to time T2 is a conventional music TV program. In the program PRG1, music titles A1, A2, A3, . . . are broadcast. A program PRG2 from time T2 to time T3 is a music TV program. In the program PRG2, music titles A11, A12, A13, . . . are broadcast. In the conventional music programs, moving pictures and sound are broadcast. The other portions shown in FIG. 11 are the same as those shown in FIG. 5.

In the system according to the second embodiment, in addition to conventional music TV programs, audio music programs are broadcast on a plurality of audio channels. In addition, download audio data and GUI data are broadcast. On each audio channel, the same music title is repeatedly broadcast in a predetermined period. Thus, the listener can select a desired music title and download audio data corresponding to the selected music title to the storage device.

Figure 12:
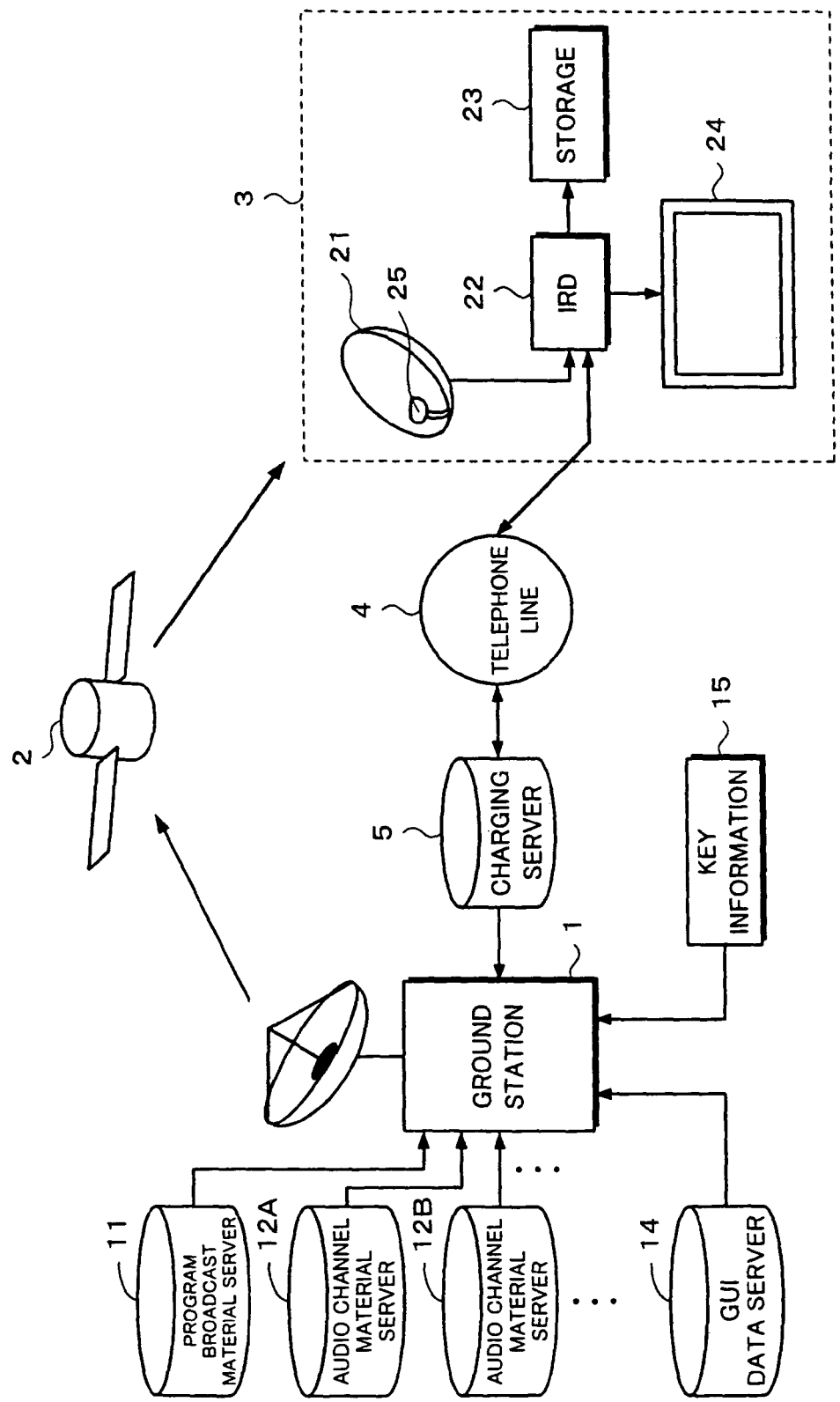
FIG. 12 is a block diagram showing the overall structure of a second example of the broadcasting system according to the second embodiment of the present invention.
Figure 13:
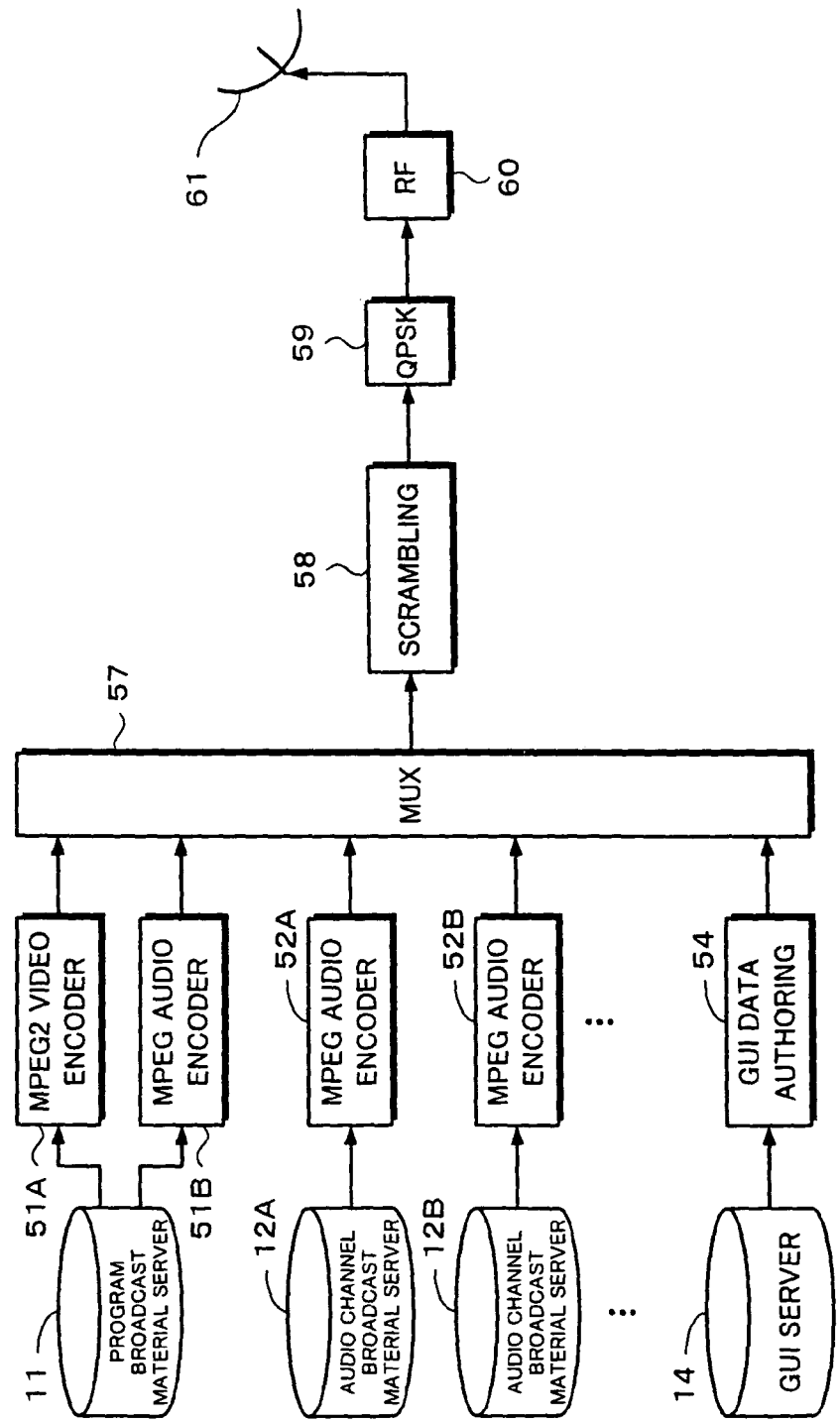
FIG. 13 is a block diagram showing the structure of a ground station of the second example of the broadcasting station according to the second embodiment of the present invention.

The system may broadcast only conventional video music programs, music titles on a plurality of audio channels, and GUI data rather than download audio data. In this case, as shown in FIGS. 12 and 13, a download audio data material server is not required on the transmitting side. In a conventional music broadcast program, video data that has been compressed in MPEG 2 format and audio data are transmitted. In addition, the same music title is repeatedly broadcast in a predetermined period on each audio channel.

Figure 14:
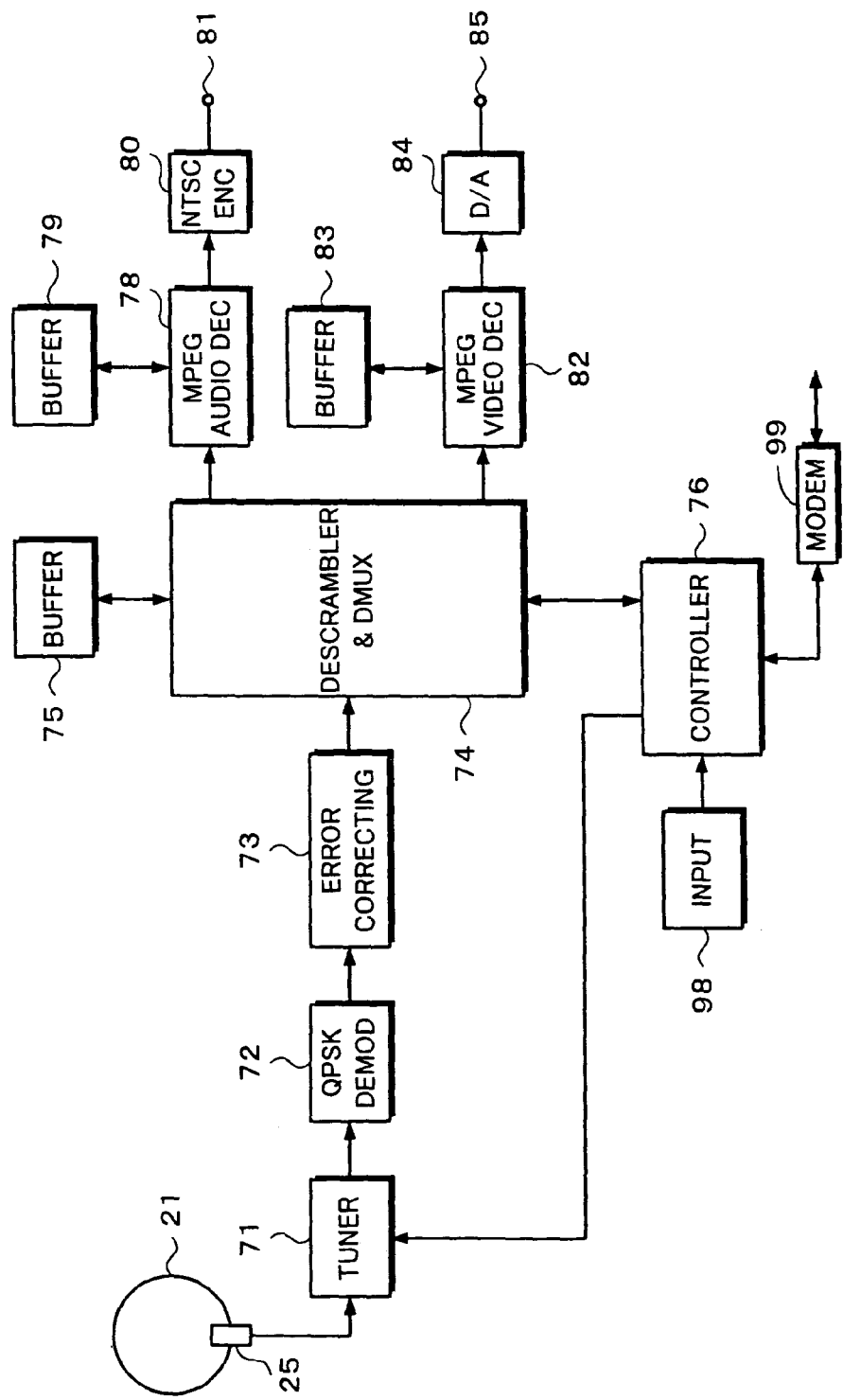
FIG. 14 is a block diagram showing the structure of an IRD according to the second embodiment of the present invention.

Moreover, as shown in FIG. 14, an ATRAC decoder that decodes download audio data is not required on the receiving side. A program transmitted on a conventional music broadcast channel and a program transmitted on each audio channel are the same as those in the system that transmits download audio data.

In the system that does not transmit download audio data, although audio data cannot be downloaded, on a screen as shown in FIG. 2, the listener can listen to a demo of a desired music title. In addition, audio data that has been compressed in MPEG audio format is transmitted on each audio channel. Thus, audio data transmitted on each audio channel can be recorded to the storage device.

In the above-described first and second embodiments, the storage device that downloads audio data corresponding to a received music title is, for example, an MD recorder/player, a DAT recorder/player, or a compact cassette recorder/player. The storage device may be a compact cassette recorder/player that has only an analog input. The storage device may be an MD recorder/player or a DAT recorder/player that has a PCM (Pulse Code Modulation) audio data input. The download music data is compressed in, for example, ATRAC 2 format. The storage device may directly input ATRAC 2 data. The storage device may have a mode setting function of which the mode of the storage device can be set with an external control signal. The storage device may have a digital interface corresponding to, for example, IEEE 1394 format.

Thus, a variety of types of the storage device may be connected to the IRD. Thus, the IRD should be connected to the storage device in an optimum connecting state. However, when the user sets the optimum connecting state corresponding to the storage device, he or she should pay special attention to the connection of the storage device to the IRD.

Figure 15A:
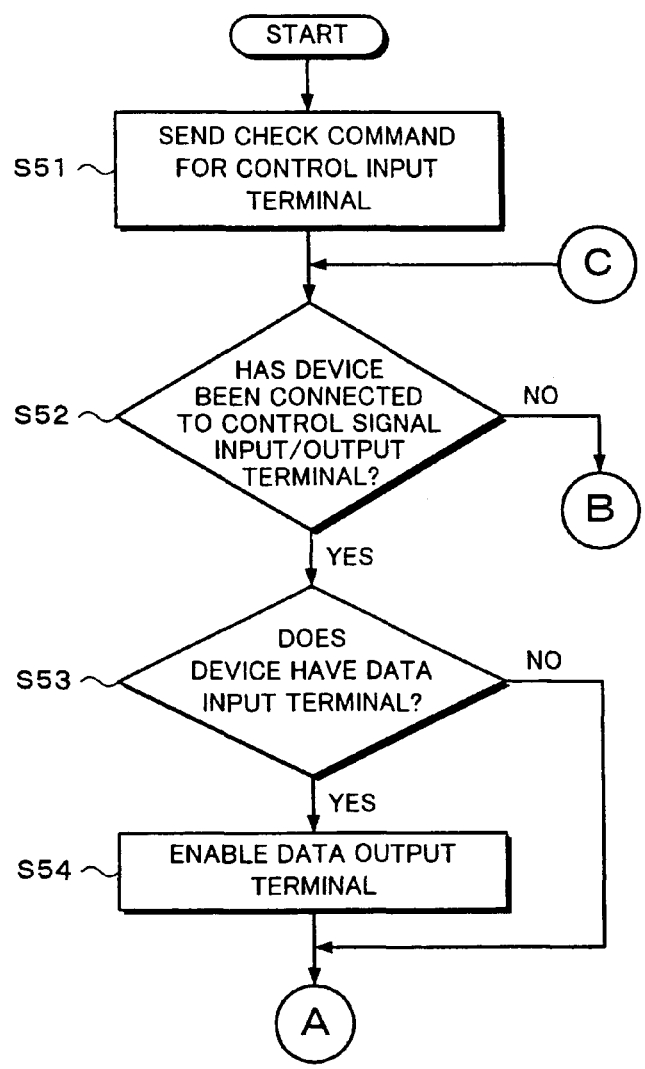
FIGS. 15A to 15C are flow charts for explaining a connecting process for an IRD and a storage device of a broadcasting system according to the present invention.
Figure 15B:
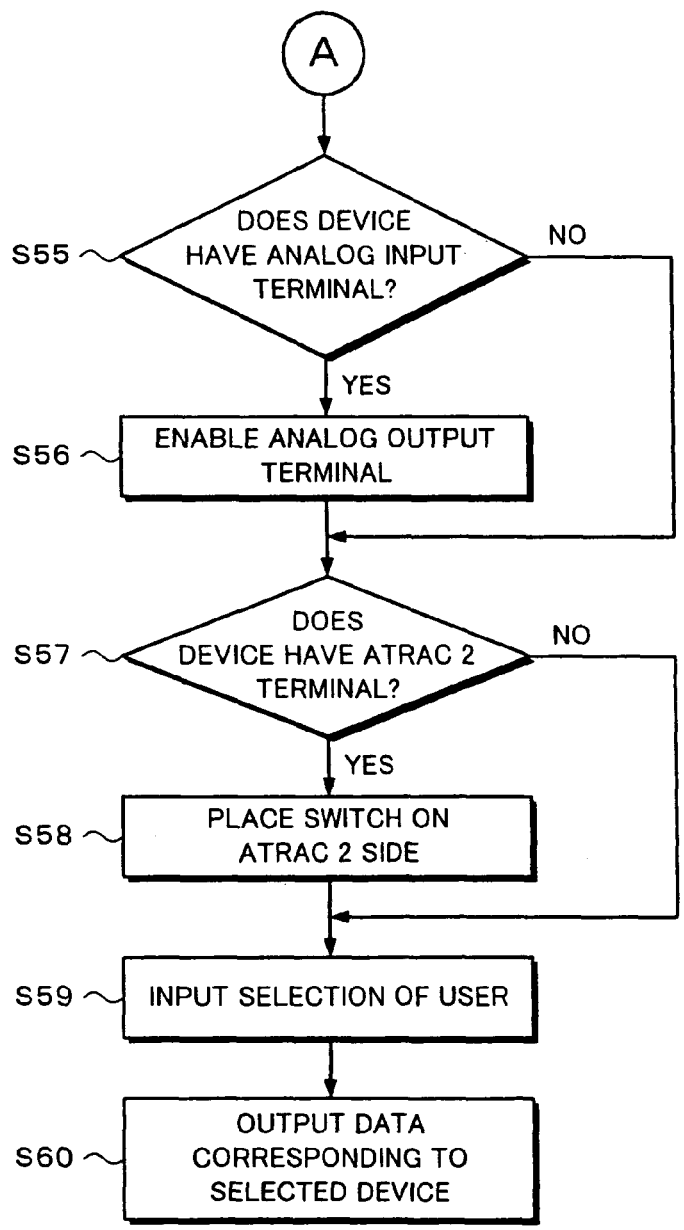
Figure 15C:
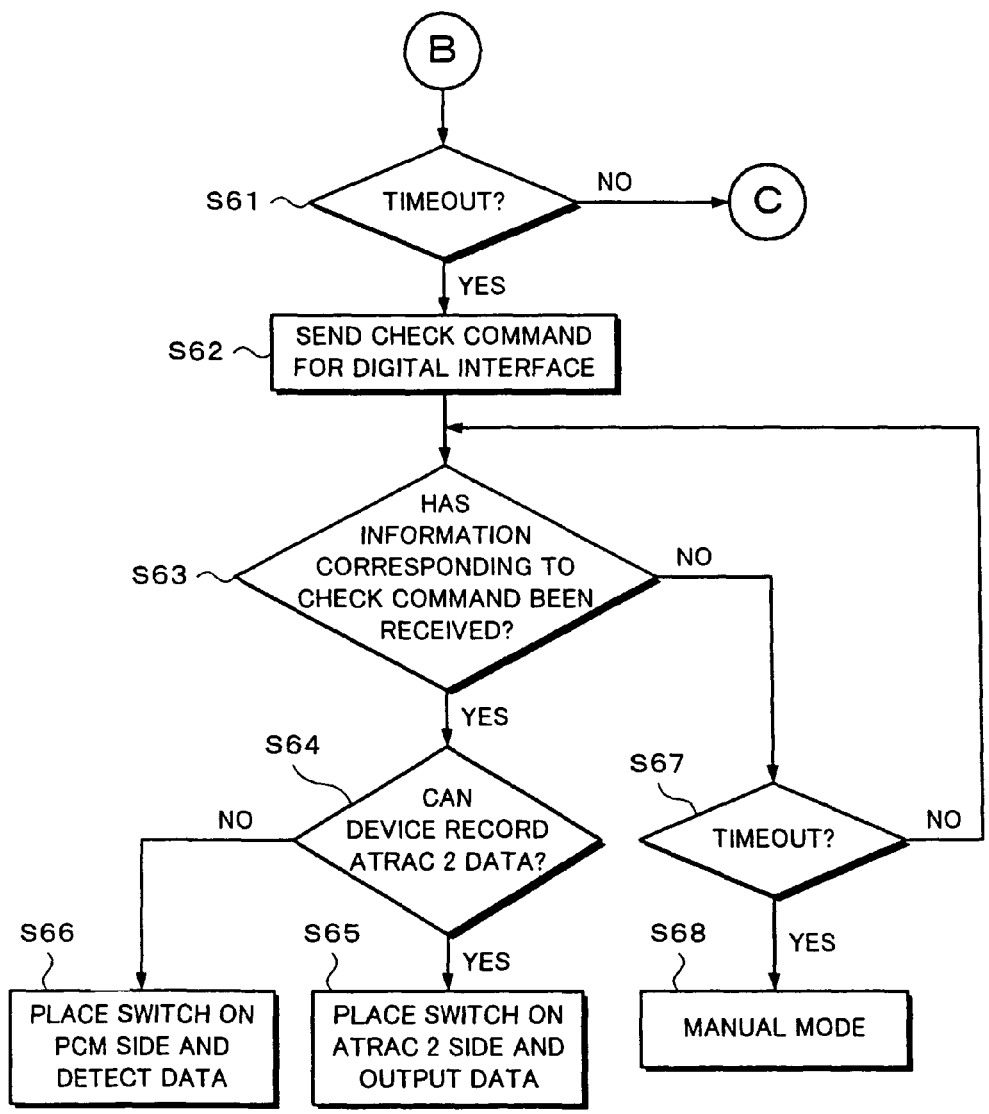

To solve such a problem, when audio data is downloaded, a process shown in FIG. 15 is performed by the IRD 22 shown in FIG. 8. Thus, the optimum terminal is automatically selected. Next, a process for automatically selecting the optimum terminal will be described as a third embodiment of the present invention. The process is performed by the IRD 22.

In FIG. 15, a check command is sent to the control signal input/output terminal 97 (at step S51) It is determined whether or not a device has been connected to the control signal input/output terminal 97 of the storage device 23 (at step S52).

When the determined result at step S52 is Yes (namely, a device has been connected to the control signal input/output terminal 97), corresponding to a control signal, data is exchanged between the IRD 22 and the storage device 23. Thereafter, it is determined whether or not the storage device 23 has a data input terminal corresponding to, for example, IEC 958 standard (at step S53).

When the determined result at step S53 is Yes (namely, the storage device 23 has a data input terminal corresponding to, for example, IEC 958 standard), the data output terminal 93 is enabled (at step S54). Thereafter, it is determined whether or not the storage device 23 has an analog audio input terminal (at step S55).

When the determined result at step S53 is No (namely, the storage device 23 does not have an IEC 958 input terminal), the flow advances to step S55. At step S55, it is determined whether or not the storage device 23 has an analog audio input terminal.

When the determined result at step S55 is Yes (namely, the storage device 23 has an analog audio input terminal), the analog audio signal output terminal 95 is enabled (at step S56). Thereafter, it is determined whether or not the storage device 23 has an ATRAC 2 input terminal (at step S57).

When the determined result at step S55 is No (namely, the storage device 23 does not have an analog audio input terminal), the flow advances to step S57. At step S57, it is determined whether or not the storage device 23 has an ATRAC 2 input terminal.

When the determined result at step S57 is Yes (namely, the storage device 23 has an ATRAC 2 input terminal), the ATRAC 2 data output is enabled (at step S58). In other words, the switch circuit 91 shown in FIG. 8 is placed on the terminal 91B side. Thereafter, the user is prompted for an output selection (at step S59). Data corresponding to the output selection of the user is output (at step S60).

When the determined result at step S57 is No (namely, the storage device 23 does not have an ATRAC 2 input terminal), the user is prompted for an output selection (at step S60). Data corresponding to the output selection of the user is output (at step S60).

When the determined result at step S52 is No (namely, a device has not been connected to the control signal input/output terminal 97 of the storage device 23), it is determined whether or not a predetermined time period has elapsed (at step S61). When the determined result at step S61 is Yes (namely, the predetermined time period has elapsed), a check command that determines whether or not an IEEE 1394 device has been connected is sent to the digital interface 96 (at step S62). Thereafter, it is determined whether or not information corresponding to the check command has been received from the device (at step S63).

When the determined result at step S63 is Yes (namely, the information has been received from the device), it is determined whether or not the device can record ATRAC 2 data (at step S64). When the determined result at step S64 is Yes (namely, the device can record ATRAC 2 data), the switch circuit 91 is placed on the terminal 91B side. In addition, the ATRAC 2 data is output from the digital interface 96 (at step S65). When the determined result at step S64 is No (namely, the device cannot record ATRAC 2 data), the switch circuit 91 is placed on the terminal 91A side. Thus, PCM data is output from the digital interface 96 (at step S66).

When the determined result at step S63 is No (namely, the information has not been received from the device), it is determined whether or not a timeout has taken place (at step S67). When the determined result at step S67 is Yes (namely, a timeout has taken place), the manual mode is set (at step S68).

In the above-described example, download data has been compressed in ATRAC 2 format. However, according to the present invention, the compressing format is not limited to ATRAC 2 format. In other words, another compressing format, for example, ATRAC format, may be used.

Next a fourth embodiment of the present invention will be described. In a digital satellite broadcast, a signal is unidirectionally broadcast from a broadcasting station to a receiving station. Thus, when a music title that is broadcast is recorded to a storage device, unless the recording timing is carefully set, the beginning and end of the music title may not be recorded.

In other words, when a music title that is broadcast is recorded by an MD recorder/player or the like, the user places the MD recorder/player in record pause mode until the broadcast of the music title starts. After the broadcast of the music title starts, the user switches record pause mode of the MD recorder/player or the like to record mode. After the broadcast of the music title ends, the user stops record mode of the MD recorder/player. However, it is troublesome for the user to start and stop record mode of the MD recorder/player. In addition, unless the user pays special attention to the recording timing, the beginning and end of the music title may be lost.

Figure 17:
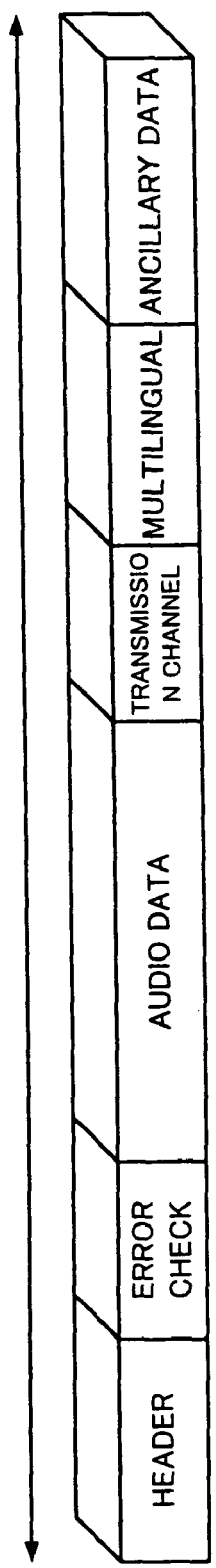
FIG. 17 is a schematic diagram showing a data stream of an audio channel according to the third embodiment of the present invention.

To solve such a problem, identification signal generating circuits 41A, 41B, . . . are disposed as shown in FIG. 16. The identification signal generating circuits 41A, 41B, . . . generate a start flag and an end flag. Corresponding to the start position and the end position of each music title, the start flag and the end flag are added. In other words, as shown in FIG. 17, transmitted MPEG audio data is composed of a header, an error check code, audio data, transmission channel data, multilingual data, and ancillary data. As ancillary data, the start flag and the end flag are inserted.

The start flag and the end flag allow data of an audio channel received on the home receiving facility 3 side to be accurately recorded to the storage 23. The start flag and the end flag are used to reserve a music title recorded on the receiving facility 3 side. When the ATRAC 2 encoder 53 forms packets, the ID generating circuits 42 generates ID data corresponding to the start position and the end position of each music title. The ID data is included in the header of each data packet. With the ID data, received data of an audio channel can be securely recorded to the storage 23 on the home receiving facility 3 side. The flags and ID data are also used to allow a music program to be reserved on the home receiving facility 3 side.

Figure 18:
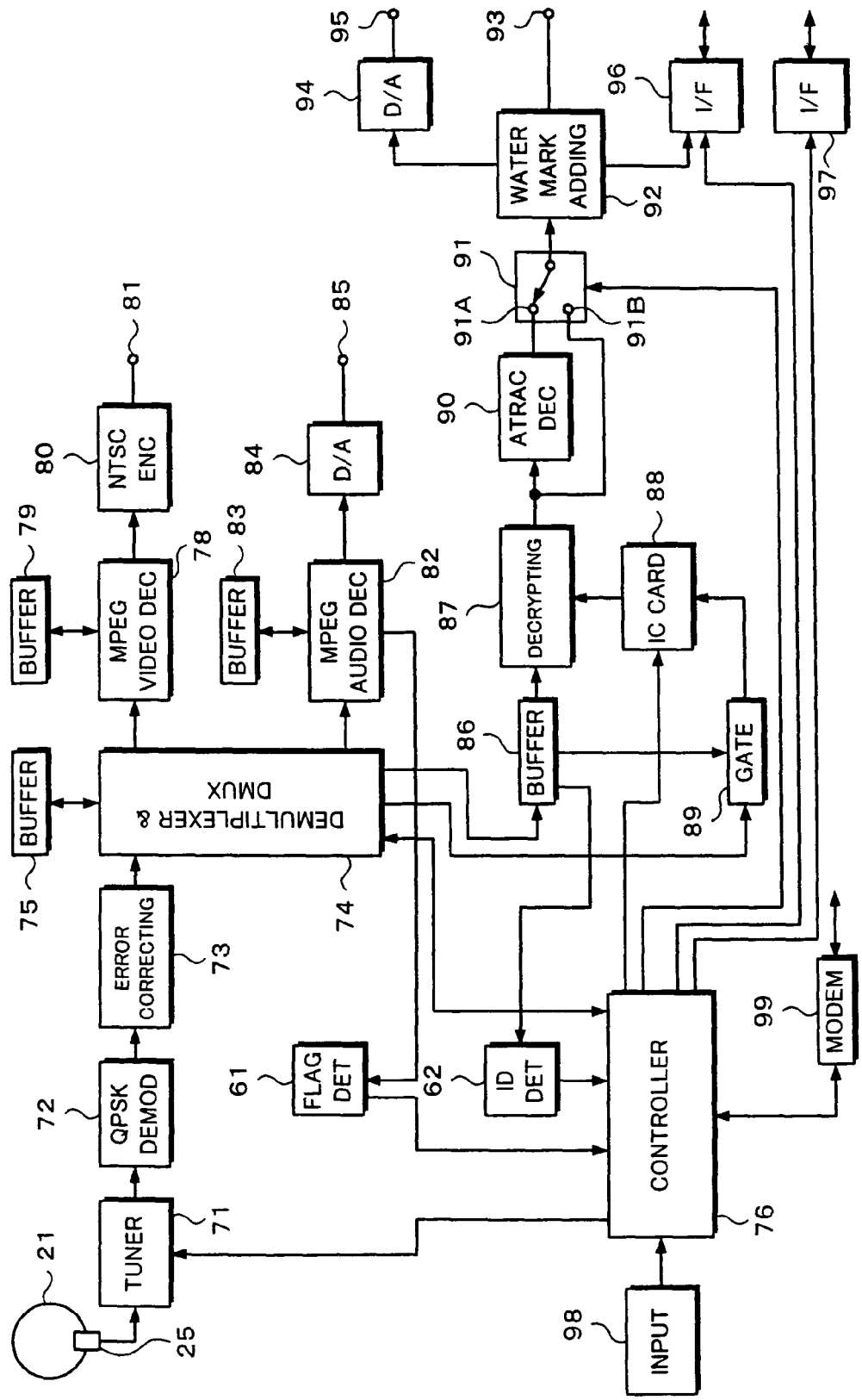
FIG. 18 is a block diagram showing the structure of an IRD according to the third embodiment of the present invention.
Figure 19:
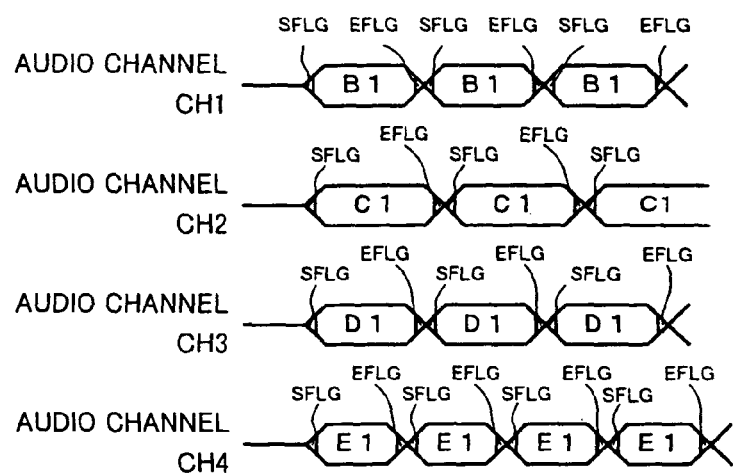
FIG. 19 is a schematic diagram for explaining detections of a start position and an end position of a music title on an audio channel according to the third embodiment of the present invention.

In other words, as shown in FIG. 19, a start flag SFLG and an end flag EFLG are added to the beginning and the end of audio data transmitted on each of audio channels CH1, CH2, . . . , respectively. Thus, when the beginning of a music title is detected with the start flag, the recording operation of the music title to the storage device 23 starts. When the end of the music title is detected with the end flag EFLG, the recording operation of the music title to the storage device 23 ends. To detect the start flag SFLG and the end flag EFLG, as shown in FIG. 18, the IRD 22 has a flag detecting circuit 61 that detects the start flag SFLG and the end flag EFLG of audio data transmitted on an audio channel. With the start flag and the end flag, the listener can accurately record a desired music title to the storage device 23 without need to consider the record timing.

Figure 21:
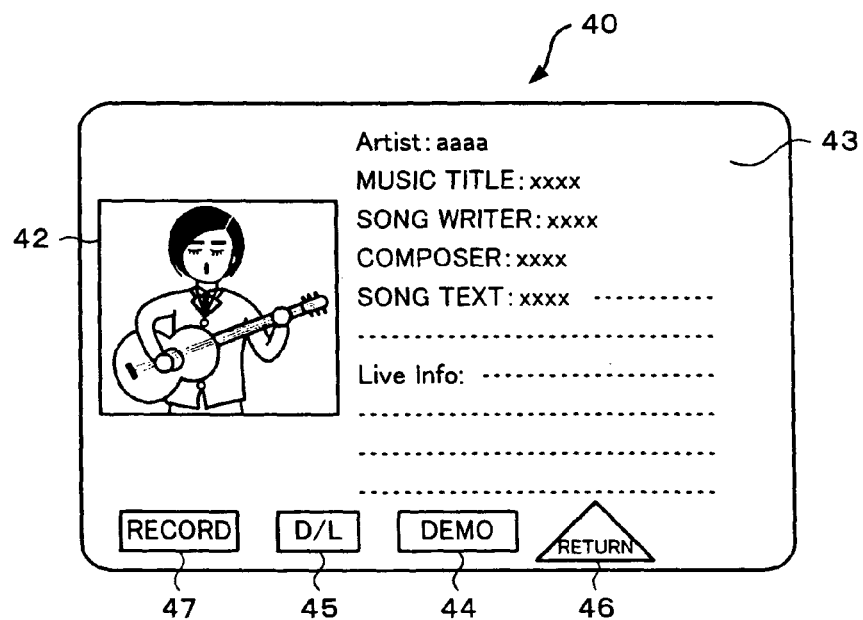
FIG. 21 is a schematic diagram for explaining an example of a display screen according to the third embodiment of the present invention.

In other words, when the listener wants to record a music title on an audio channel to the storage device 23, he or she presses a record button 47 of a GUI as shown in FIG. 21. When the record button 47 is pressed, audio data corresponding to the selected music title is downloaded and recorded to the storage device 23.

Figure 20:
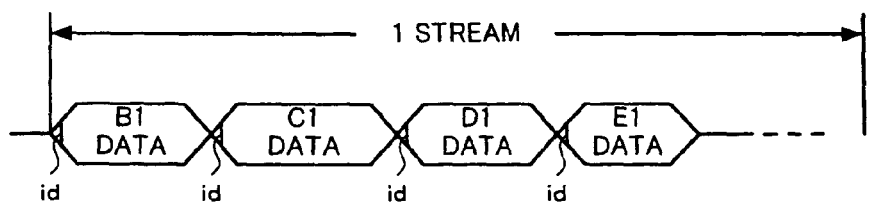
FIG. 20 is a schematic diagram for explaining detections of a start position and an end position of download data according to the third embodiment of the present invention.

When the listener wants to download ATRAC 2 data, he or she presses a download button 45 of the GUI shown in FIG. 21. When the listener presses the download button 45, ATRAC 2 data corresponding to the selected music title is downloaded and recorded to the storage device 23. As shown in FIG. 20, at the beginning and end of download ATRAC 2 data, ID data id is added to the header of each packet data. Thus, when the beginning of the music title is detected with the ID data id, the recording operation of the music title to the storage device 23 starts. When the end of the music title is detected with the ID data id, the recording operation of the music title to the storage device 23 stops. To detect the ID data id, as shown in FIG. 18, the IRD 22 has an ID detecting circuit 62.

Thus, according to the fourth embodiment, a music title information page 43 is displayed on a GUI screen 40. With the information page 43, the listener can know information of each music title. When the listener selects the music title, he or she can listen to a demo of the music title. When the listener presses the record button 47, an audio signal corresponding to the music title on an audio channel is recorded to the storage device 23. When the listener presses the download button 45, the audio data corresponding to the music title is downloaded and recorded to the storage device 23.

Figure 22:
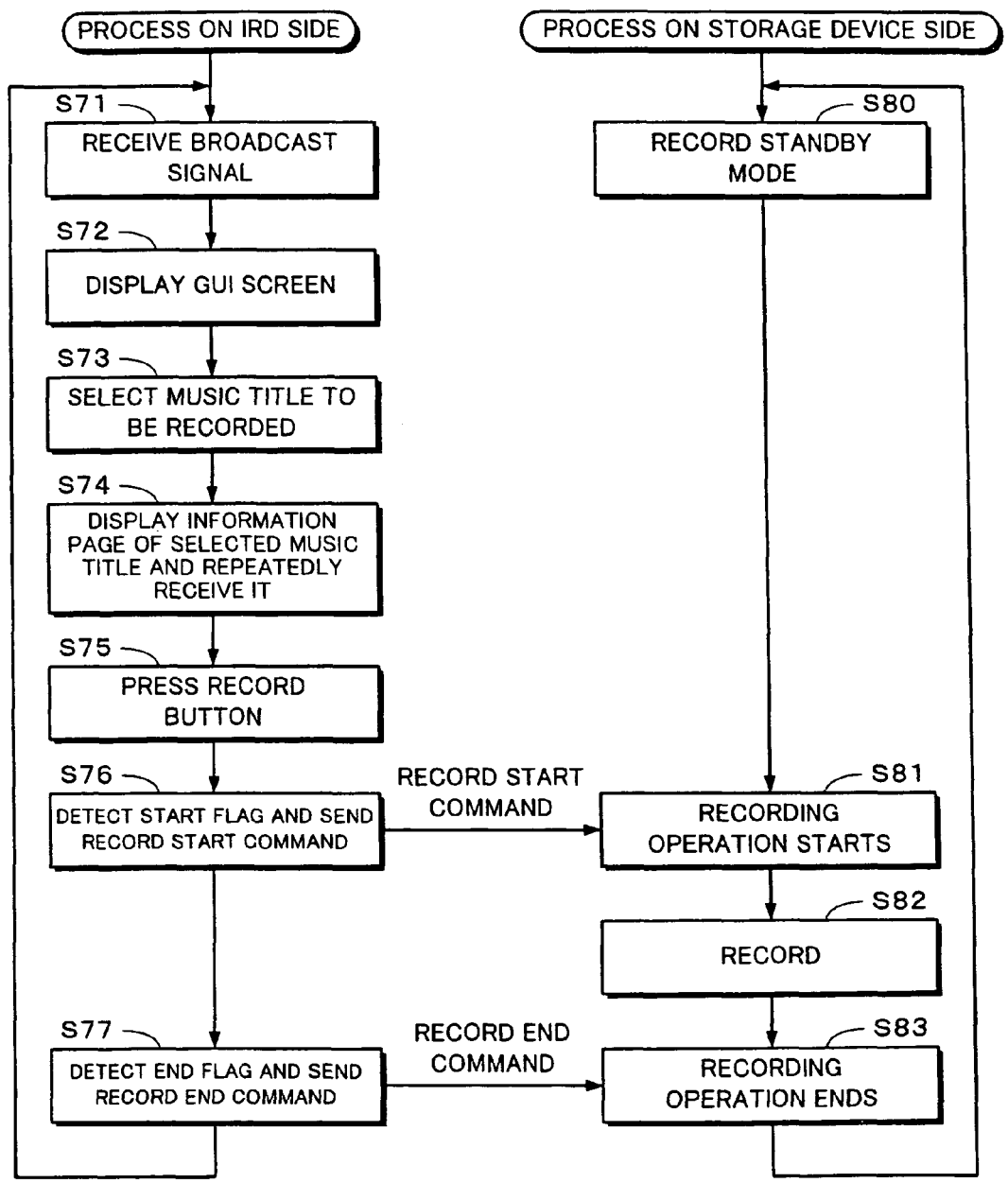
FIG. 22 is a flow chart for explaining a process performed between an IRD and a storage device in an audio channel recording process according to the third embodiment of the present invention.

FIG. 22 is a flow chart showing a process corresponding to the record button 47 for recording a music program transmitted on an audio channel to the storage device 23. In FIG. 22, steps S71 to S77 are performed on the IRD 22 side, whereas steps S80 to S83 are performed on the storage device 23 side.

When a broadcast signal is received (at step S71), a graphic screen is displayed corresponding to GUI data (at step S72). At this point, the storage device 23 side has been placed in record standby mode (at step S80).

When a music title is selected with the music title selection button (at step S73), an information page of the selected music title is displayed. In addition, an audio channel of the selected music title is selected. Since the same music title is repeatedly broadcast in a predetermined period on each audio channel, the listener can repeatedly listen to the selected music title (at step S74).

When the record button 47 is pressed (at step S75, the start flag SFLG is detected. When the first start flag SFLG is detected, the IRD 22 sends a record start command to the storage device 23 (at step S76).

When the storage device 23 side receives a record start command from the IRD 22, the storage device 23 is placed in record mode (at step S81). The storage device 23 continues the recording operation until the storage device 23 receives a record end command from the IRD 22 (at step S82).

Thereafter, the IRD 22 detects the end flag EFLG. When the IRD 22 detects the end flag EFLG, the IRD 22 sends the record end command to the storage device 23 (at step S77).

When the storage device 23 receives the record end command from the IRD 22, the recording operation of the storage device 23 stops (at step S83).

Figure 23:
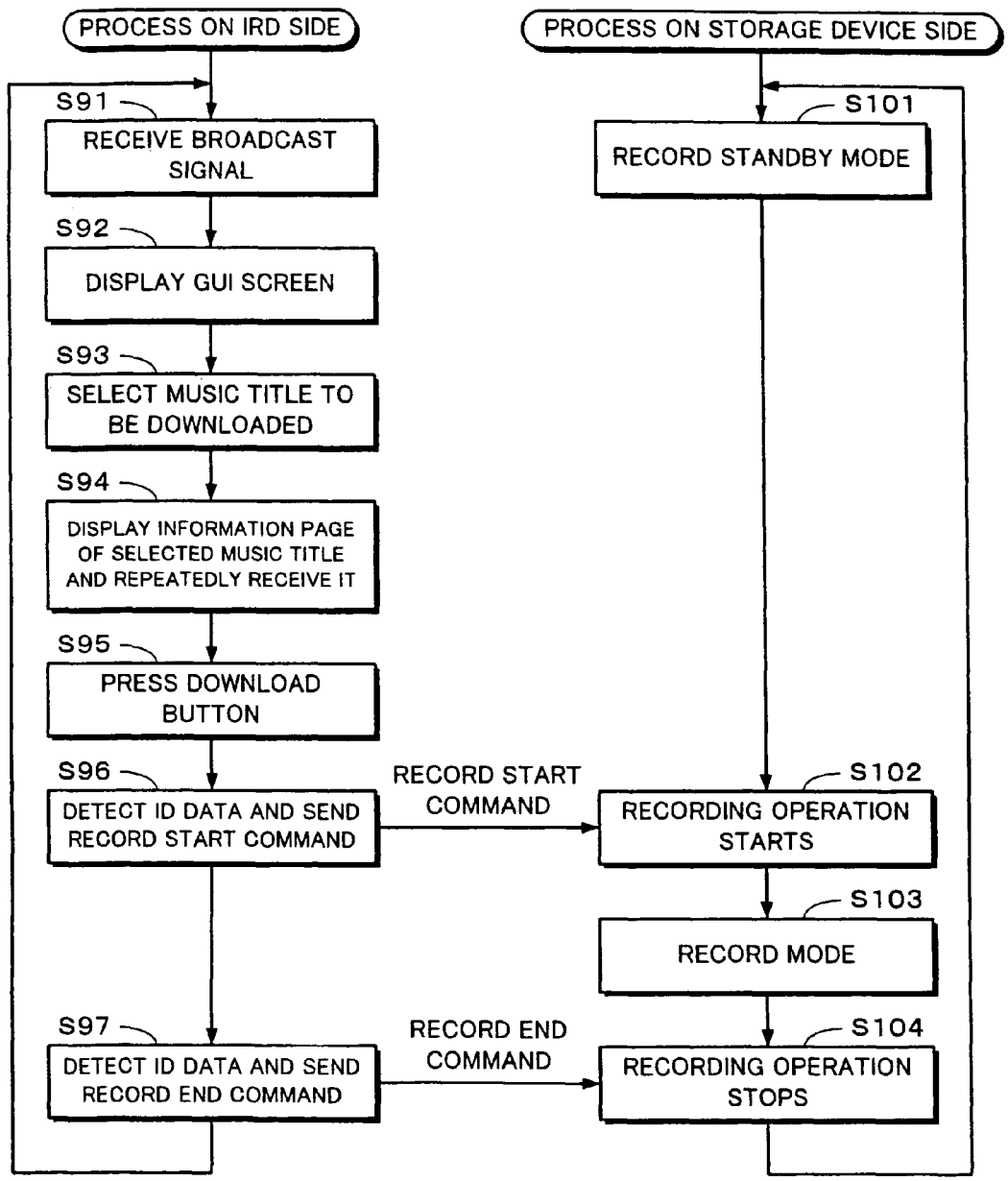
FIG. 23 is a flow chart for explaining a process performed between an IRD and a storage device in a download process according to the third embodiment of the present invention.

FIG. 23 is a flow chart showing a process corresponding to the download button 45 for recording download audio data to the storage device 23. In FIG. 23, steps S91 to S97 are performed on the IRD 22 side, whereas steps S101 to S104 are performed on the storage device 23 side.

When a broadcast signal is received (at step S91), a graphic screen corresponding to GUI data is displayed (at step S92). At this point, the storage device 23 has been placed in record standby mode (at step S101).

When a music title is selected with the music title selection button (at step S93), an information page 40 of the selected music title is displayed. In addition, an audio channel corresponding to the selected music title is selected. On each audio channel, the same music title is repeatedly broadcast in a predetermined period. Thus, the listener can repeatedly listen to the selected music title (at step S94).

When the download button 45 is pressed (at step S95), ID data is detected. When the ID data is detected, a record start command is sent from the IRD 22 to the storage device 23 (at step S96).

When the storage device 23 side receives the record start command from the IRD 22, the storage device 23 is placed in record mode (at step S102). The storage device 23 continues the recording operation until the storage device 23 receives a record end command from the IRD 22 (at step S103).

The IRD 22 side detects ID data. When the IRD 22 side detects the ID data, the IRD 22 sends the record end command to the storage device 23 (at step S97). Thereafter, the flow returns to step S91.

When the storage device 23 side receives the record end command from the IRD 22, the recording operation of the storage device 23 stops (at step S104). Thereafter, the flow returns to step S101.

In the above-described example, the record button 47 and the download button 45 are operated for each music title so as to record it to the storage device 23. Alternatively, a plurality of music titles may be reserved and successively recorded or downloaded.

Figure 24:
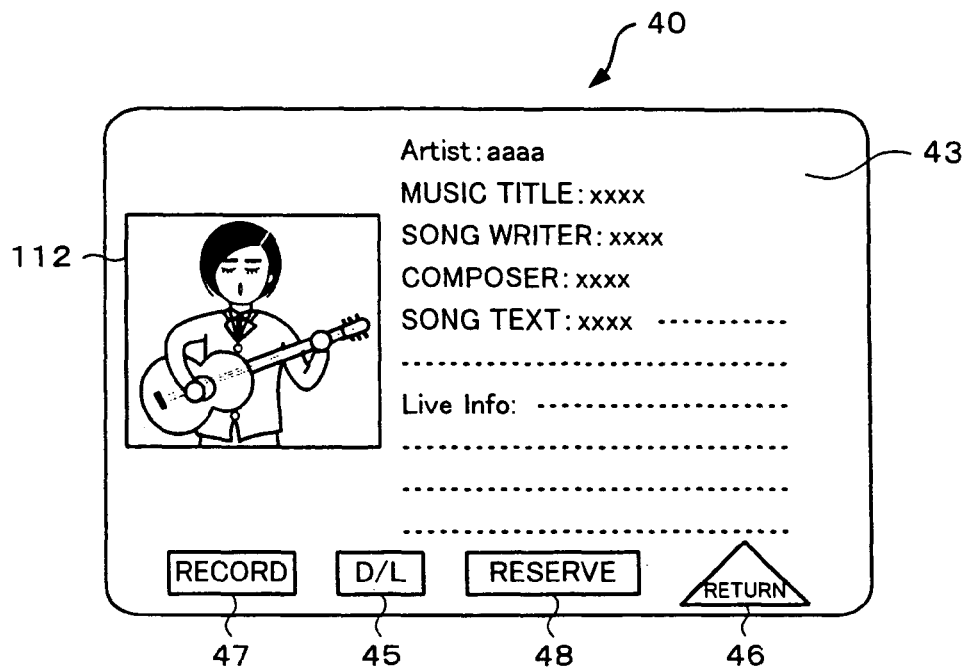
FIG. 24 is a schematic diagram for explaining another example of a display screen of an example of a broadcasting system according to the present invention.
Figure 25:
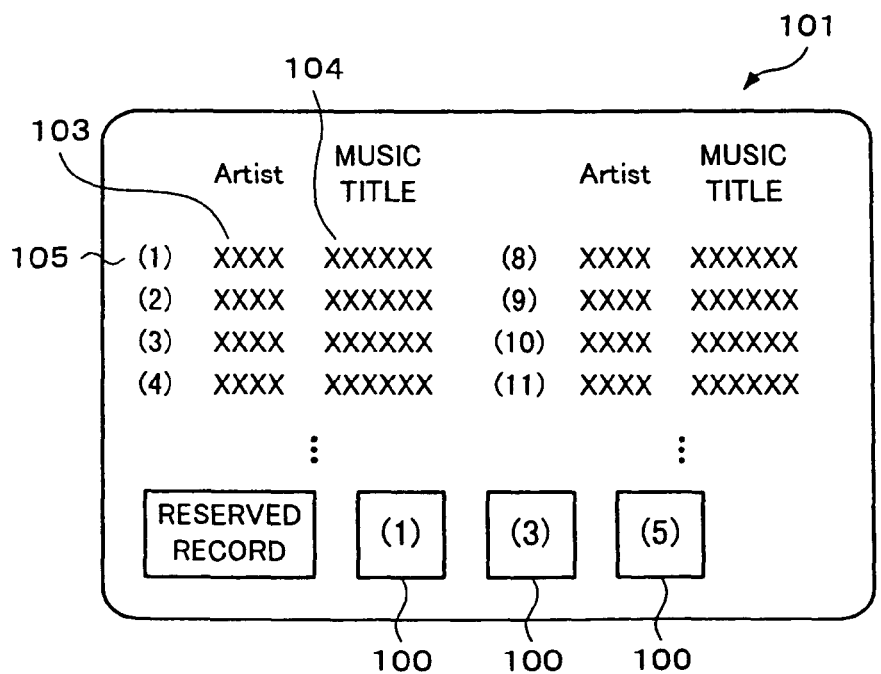
FIG. 25 is a schematic diagram for explaining another example of a display screen of the example of the broadcasting system according to the present invention.

In other words, when a plurality of music titles are reserved with a reserve button 48 and a record button 47 as shown in FIG. 24, reserved music titles 100, 100, . . . are displayed as shown in FIG. 25.

When a plurality of music titles are reserved, audio channels are successively selected and the reserved music titles are recorded to the storage device in the reserved order.

Figure 26:
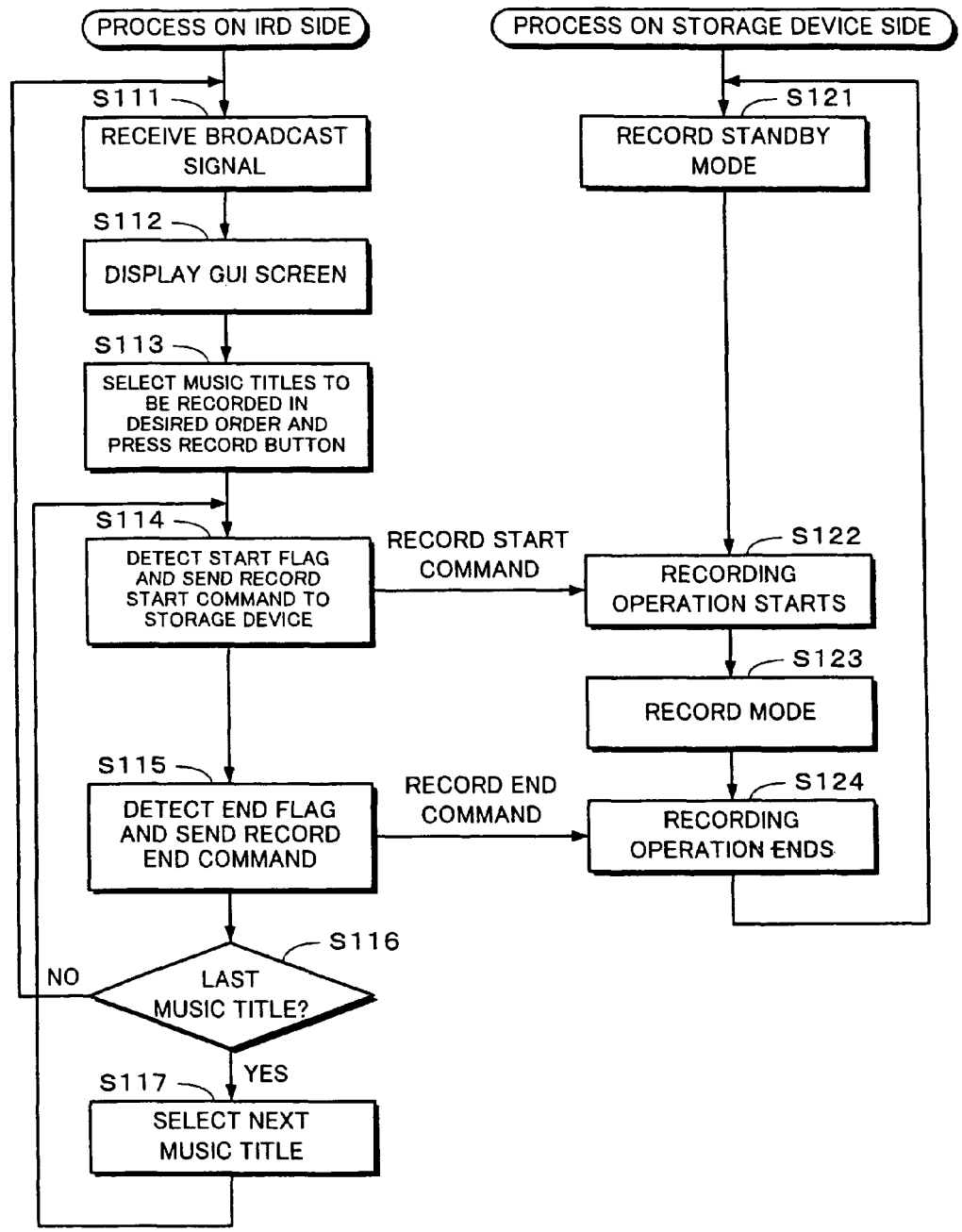
FIG. 26 is a flow chart for explaining a process performed between the IRD and the storage device.

FIG. 26 is a flow chart showing a process corresponding to the reserve button 48 for reserving a plurality of music titles and downloading them to the storage device 23. In FIG. 26, steps S111 to S117 are performed on the IRD 22 side, whereas steps S121 to S124 are performed on the storage device 23 side.

When a broadcast signal is received (at step S111), a graphic screen corresponding to GUI data is displayed (at step S112). At this point, the storage device 23 has been placed in record standby mode (at step S121).

When a plurality of music titles are successively selected with the reserve button 48 and then the record button 47 is pressed, a reserve recording operation is performed (at step S113).

An audio channel corresponding to the first reserved music title is selected. The start flag SFLG is detected. When the first start flag SFLG is detected, a record start command is sent from the IRD 22 to the storage device 23 (at step S114).

When the storage device 23 side receives the record start command from the IRD 22, the storage device 23 is placed in record mode (at step S122). The storage device 23 continues the recording operation until the storage device 23 receives a record end command from the IRD 22 (at step S123).

Next, the IRD 22 side detects the end flag EFLG. When the IRD 22 detects the end flag EFLG, the IRD 22 sends a record end command to the storage device 23 (at step S115).

When the storage device 23 side receives the record end command from the IRD 22, the recording operation of the storage device 23 stops (at step S124). Thereafter, the flow returns to step S121.

The IRD 22 determines whether or not the storage device has recorded the last reserved music title (at step S116). When the determined result at step S116 is No, the IRD 22 selects the next reserved music title (at step S117). Thereafter, the flow returns to step S114. At step S111, the IRD 22 performs the similar process. Thus, the storage device 23 records the next music title. After the storage device 23 has recorded the last music title, the flow returns to step S111.

Figure 27:
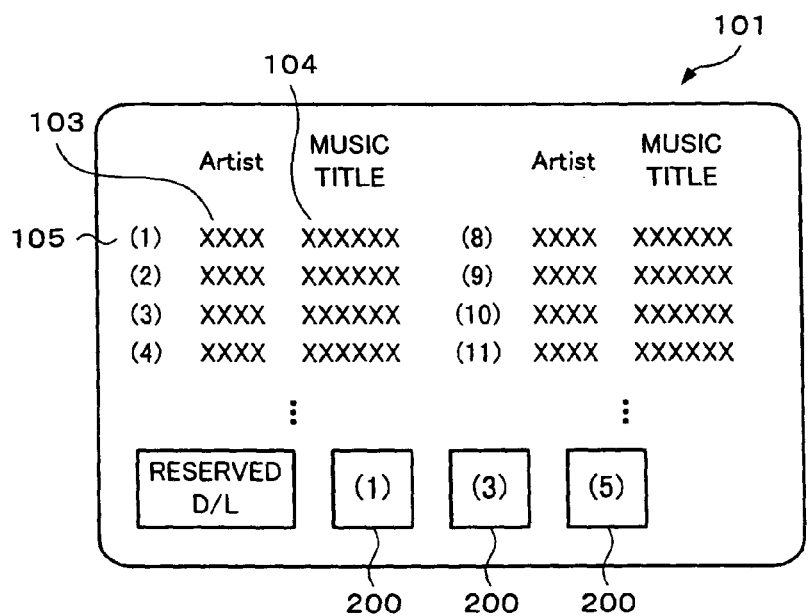
FIG. 27 is a schematic diagram for explaining another example of a display screen of the example of the broadcasting system according to the present invention.

When a plurality of music titles are selected with the reserve button 48 and then the download button 45 is pressed, as shown in FIG. 27, reserved music title numbers 200, 200, . . . are displayed. When a plurality of music titles are reserved, download audio data corresponding to the reserved music titles is successively recorded to the storage device 23 in the reserved order.

Figure 28:
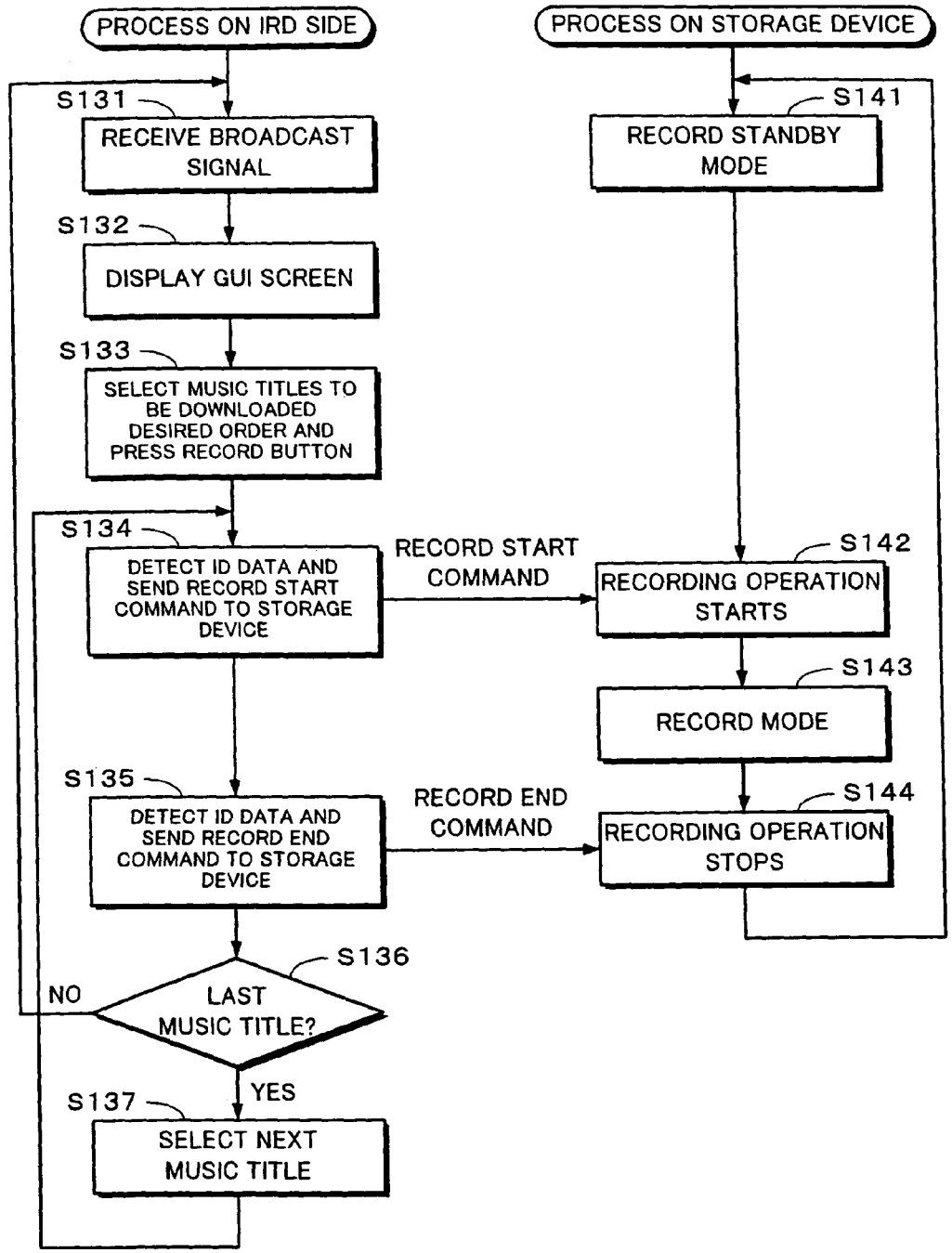
FIG. 28 is a flow chart for explaining a process performed between an IRD and a storage device.

FIG. 28 is a flow chart showing a process corresponding to the reserve button 48 and the download button 48 for reserving a plurality of music titles and recording download audio data corresponding to the reserved music titles to the storage device. In FIG. 28, steps S131 to S137 are performed on the IRD 22 side, whereas steps S141 to S144 are performed on the storage device 23 side.

When a broadcast signal is received (at step S131), a graphic screen corresponding to GUI data is displayed (at step S132). At this point, the storage device 23 side has been placed in record standby mode (at step S141).

When a plurality of music titles are successively selected with the reserve button 48 and then the download button 45 is pressed, a download reserving operation is performed (at step S133).

Thereafter, ID data is detected. When the ID data is detected, the IRD 22 sends a record start command to the storage device 23 (at step S134).

When the storage device 23 receives the record start command from the IRD 22, the storage device 23 is placed in record mode (at step S142). The storage device 23 continues the recording operation until the storage device 23 receives a record end command from the IRD 22 (at step S143).

Next, the IRD 22 side detects ID data. When the IRD 22 detects the ID data, the IRD 22 sends a record end command to the storage device 23 (at step S135).

When the storage device 23 receives the record end command from the IRD 22, the recording operation of the storage device 23 stops (at step S144). Thereafter, the flow returns to step S141.

Next, it is determined whether or not the storage device 23 has recorded the last reserved music title (at step S136). When the determined result at step S136 is No (namely, the storage device 23 has not recorded the last music title), audio data corresponding to the next music title is selected (at step S137). Thereafter, the flow returns to step S134. At step S134, the IRD 22 side performs the similar process and causes the storage device 23 to record the next music title. When the determined result at step S136 is Yes (namely, the storage device 23 has recorded the last music title), the flow returns to step S131.

According to an embodiment of the present invention, download audio data is stored to the information storage device. Thus, audio data according to desired music titles can be downloaded. Consequently, information of broadcast music titles can be easily obtained. In addition, audio data corresponding to desired music titles can be easily stored to the information storage device.

According to another embodiment of the present invention, the optimum connecting state corresponding to the type of the storage device can be automatically set.

In addition, according to a further embodiment of the present invention, when an audio signal transmitted on an audio channel is stored to the storage device, with a start flag and an end flag, each music title can be accurately recorded to the storage device without a loss of the beginning and the end of the music title. In a stream of download audio data, ID data is inserted corresponding to the beginning and end of each music title. When an audio signal transmitted on an audio channel is recorded to the storage device, with the ID data, each music title can be accurately recorded without a loss of the beginning and the end of the music title. With the start flag and the end flag, a plurality of music titles can be reserved and the reserved music titles can be automatically recorded to the storage device in the reserved order. In addition, with ID data, a plurality of music titles can be reserved and music data corresponding thereto can be automatically downloaded to the storage device in the reserved order.

INDUSTRIAL UTILIZATION

As described above, the transmitting apparatus, the transmitting method, the information editing apparatus, the editing method, the receiving apparatus, the receiving method, the information storing apparatus, the information storing method, and the broadcasting system are suitable for transmitting music data with a digital satellite broadcast.

The invention claimed is:

1. A method of displaying information, the method comprising:
generating, by a control processing unit, a display including information regarding a plurality of media content items;
receiving a user selection of one of the plurality of media content items;
in response to the receiving a user selection of one of the plurality of media content items, generating by the control processing unit, a display including simultaneous display of a detail information area, a demo selection area, and a purchase selection area for purchasing and downloading an associated media content item upon selection, each associated with the one of the plurality of media content items;
receiving a user selection of one of the demo selection area and the purchase selection area;
producing an audible demo of the one of the plurality of media content items, when the demo selection area associated with the one of the plurality of media content items is selected; and
executing a purchase process that includes charging for, and automatically downloading and storing the one of the plurality of media content items without producing an audible demo, when the purchase selection area associated with the one of the plurality of media content items is selected.

2. A method of displaying information, the method comprising:
generating, by a control processing unit, a display including information regarding a plurality of media content items;
receiving a user selection of one of the plurality of media content items;
in response to the receiving a user selection of one of the plurality of media content items, generating by the control processing unit, a display including simultaneous display of a detail information area, a still image, a demo selection area, and a purchase selection area for purchasing and downloading an associated media content item upon selection, each associated with the one of the plurality of media content items;
receiving a user selection of one of the demo selection area and the purchase selection area;
producing an audible demo of the one of the plurality of media content items, when the demo selection area associated with the one of the plurality of media content items is selected; and
executing a purchase process that includes charging for, and automatically downloading and storing the one of the plurality of media content items without producing an audible demo, when the purchase selection area associated with the one of the plurality of media content items is selected.

3. A method of displaying information, the method comprising:
generating, by a control processing unit, a display including information regarding a plurality of media content items;
receiving a user selection of one of the plurality of media content items;
in response to the receiving a user selection of one of the plurality of media content items, generating by the control processing unit, a display including simultaneous display of a detail information area including a title and an artist name, a demo selection area, and a purchase selection area for purchasing and downloading an associated media content item upon selection, each associated with the one of the plurality of media content items;
receiving a user selection of one of the demo selection area and the purchase selection area;
producing an audible demo of the one of the plurality of media content items, when the demo selection area associated with the one of the plurality of media content items is selected; and
executing a purchase process that includes charging for, and automatically downloading and storing the one of the plurality of media content items without producing an audible demo, when the purchase selection area associated with the one of the plurality of media content items is selected.

4. A method of displaying information, the method comprising:
generating, by a control processing unit, a display including information regarding a plurality of media content items;
receiving a user selection of one of the plurality of media content items;

in response to the receiving a user selection of one of the plurality of media content items, generating by the control processing unit, a display including simultaneous display of a detail information area including content lyrics, a demo selection area, and a purchase selection area for purchasing and downloading an associated media content item upon selection, each associated with the one of the plurality of media content items;

receiving a user selection of one of the demo selection area and the purchase selection area;

producing an audible demo of the one of the plurality of media content items, when the demo selection area associated with the one of the plurality of media content items is selected; and executing a purchase process that includes charging for, and automatically downloading and storing the one of the plurality of media content items without producing an audible demo, when the purchase selection area associated with the one of the plurality of media content items is selected.

5. A method of displaying information, the method comprising:

generating, by a control processing unit, a display including information regarding a plurality of media content items, the information regarding the plurality of media content items including, for each one of the plurality of media content items, a title and an artist name;

receiving a user selection of one of the plurality of media content items;

in response to the receiving a user selection of one of the plurality of media content items, generating by the control processing unit, a display including simultaneous display of a detail information area, a demo selection area, and a purchase selection area for purchasing and downloading an associated media content item upon selection, each associated with the one of the plurality of media content items;

receiving a user selection of one of the demo selection area and the purchase selection area;

producing an audible demo of the one of the plurality of media content items, when the demo selection area associated with the one of the plurality of media content items is selected; and executing a purchase process that includes charging for, and automatically downloading and storing the one of the plurality of media content items without producing an audible demo, when the purchase selection area associated with the one of the plurality of media content items is selected.

6. A method of displaying information, the method comprising:

generating, by a control processing unit, a display including information regarding a plurality of media content items;

receiving a user selection of one of the plurality of media content items;

in response to the receiving a user selection of one of the plurality of media content items, generating by the control processing unit, a display including simultaneous display of a detail information area, a demo selection area, a purchase selection area for purchasing and downloading an associated media content item upon selection, and a return selection area, each of the detail information area, the demo selection area, and the purchase selection area being associated with the one of the plurality of media content items;

receiving a user selection of one of the demo selection area, the purchase selection area, and the return selection area;

producing an audible demo of the one of the plurality of media content items, when the demo selection area associated with the one of the plurality of media content items is selected;

executing a purchase process that includes charging for, and automatically downloading and storing the one of the plurality of media content items without producing an audible demo, when the purchase selection area associated with the one of the plurality of media content items is selected; and re-generating the display including information regarding the plurality of media content items, when the return selection area is selected.

7. A method of displaying information, the method comprising:

generating, by a control processing unit, a display including information regarding a plurality of media content items;

receiving a user selection of one of the plurality of media content items;

in response to the receiving a user selection of one of the plurality of media content items, generating by the control processing unit, a display including simultaneous display of a detail information area, a demo selection area, and a purchase selection area for purchasing and downloading an associated media content item upon selection, each associated with the one of the plurality of media content items;

receiving a user selection of one of the demo selection area and the purchase selection area;

producing an audible demo of the one of the plurality of media content items, when the demo selection area associated with the one of the plurality of media content items is selected; and executing a purchase process that includes charging for, and automatically downloading and storing the one of the plurality of media content items without producing an audible demo, when the purchase selection area associated with the one of the plurality of media content items is selected, the downloaded and stored media content item being a compressed media content item.

8. A method of displaying information, the method comprising:

generating, by a control processing unit, a display including information regarding a plurality of media content items;

receiving a user selection of one of the plurality of media content items;

in response to the receiving a user selection of one of the plurality of media content items, generating by the control processing unit, a display including simultaneous display of a detail information area, a demo selection area, and a purchase selection area for purchasing and downloading an associated media content item upon selection, each associated with the one of the plurality of media content items;

receiving a user selection of one of the demo selection area and the purchase selection area;

producing an audible demo of the one of the plurality of media content items, when the demo selection area associated with the one of the plurality of media content items is selected;

executing a purchase process that includes charging for, and automatically downloading and storing the one of the plurality of media content items without producing an audible demo, when the purchase selection area associated with the one of the plurality of media content items is selected, the downloaded and stored media content item being an encrypted media content item; and
decrypting the encrypted media content item with a predetermined key.

9. An apparatus for displaying information, the apparatus comprising:
   means for generating a display including information regarding a plurality of media content items;
   means for receiving a user selection of the plurality of media content items;
   means for generating, in response to receipt of a user selection of one of the plurality of media content items by the means for receiving, a display including simultaneous display of a detail information area, a demo selection area, and a purchase selection area for purchasing and downloading an associated media content item upon selection, each associated with the one of the plurality of media content items;
   means for receiving a user selection of one of the demo selection area and the purchase selection area;
   means for producing an audible demo of the one of the plurality of media content items, when receipt of a user selection of the demo selection area associated with the one of the plurality of media content items is received by the means for receiving a user selection of one of the demo selection area and the purchase selection area; and
   means for executing a purchase process that includes charging for, and automatically downloading and storing the one of the plurality of media content items without producing an audible demo, when receipt of a user selection of the purchase selection area associated with the one of the plurality of media content items is received by the means for receiving a user selection of one of the demo selection area and the purchase selection area.

10. The apparatus according to claim 9, wherein the means for displaying the simultaneous display further includes means for simultaneous display of a still image associated with the one of the plurality of media content items.

11. The apparatus according to claim 9, wherein the detail information area associated with the one of the plurality of media content items includes a title and an artist name.

12. The apparatus according to claim 9, wherein the detail information area associated with the one of the plurality of media content items includes content lyrics.

13. The apparatus according to claim 9, wherein the information regarding the plurality of media content items includes, for each one of the plurality of media content items, a title and an artist name.

14. The apparatus according to claim 9, wherein
   the means for displaying the simultaneous display further includes means for simultaneous display of a return selection area,
   the means for receiving a user selection of one of the demo selection area and the purchase selection area further includes means for receiving a user selection of the return selection area, and
   the apparatus further comprises means for re-generating the information regarding the plurality of media content items, when receipt of a user selection of the return selection area is received by the means for receiving a user selection of the return selection area.

15. The apparatus according to claim 9, wherein the downloaded and stored one of the plurality of media content items is a compressed media content item.

16. The apparatus according to claim 9, wherein the downloaded and stored one of the plurality of media content items is an encrypted media content item, and the apparatus further comprises
   means for decrypting the encrypted media content item with a predetermined key.

17. An apparatus for displaying information, the apparatus comprising:
   a control unit configured to a display information regarding a plurality of media content items; and
   an input unit configured to receive a user selection of one of the plurality of media content items,
   the control unit being further configured to generate, in response to receipt of a user selection of one of the plurality of media content items by the input unit, a display including simultaneous display of a detail information area, a demo selection area, and a purchase selection area for purchasing and downloading an associated media content item upon selection, each associated with the one of the plurality of media content items,
   the input unit being further configured to receive a user selection of one of the demo selection area and the purchase selection area, and
   the control unit being further configured to
   produce an audible demo of the one of the plurality of media content items, when receipt of a user selection of the demo selection area associated with the one of the plurality of media content items is received by the input unit, and
   execute a purchase process that includes charging for, and automatically downloading and storing the one of the plurality of media content items without producing an audible demo, when receipt of a user selection of the purchase selection area associated with the one of the plurality of media content items is received by the input unit.

18. The apparatus according to claim 17, wherein the control unit is further configured to simultaneously display a still image associated with the one of the plurality of media content items.

19. The apparatus according to claim 17, wherein the detail information area associated with the one of the plurality of media content items includes a title and an artist name.

20. The apparatus according to claim 17, wherein the detail information area associated with the one of the plurality of media content items includes content lyrics.

21. The apparatus according to claim 17, wherein the information regarding the plurality of media content items includes, for each one of the plurality of media content items, a title and an artist name.

22. The apparatus according to claim 17, wherein
   the control unit is further configured to simultaneously display a return selection area, the input unit is further configured to receive a user selection of the return selection area, and the control unit is further configured to re-display the information regarding the plurality of media content items, when receipt of a user selection of the return selection area is received by the input unit.

23. The apparatus according to claim 17, wherein the downloaded and stored media content item is a compressed media content item.

24. The apparatus according to claim 17, wherein the downloaded and stored media content item is an encrypted media content item, and the apparatus further comprises a decrypting unit configured to decrypt the encrypted media content item with a predetermined key.

25. The method of displaying information according to claim 1, wherein the executing the purchase process includes automatically charging for the one of the plurality of media content items in response to the purchase selection area associated with the one of the plurality of media content items being selected by the user.

* * * * *